US011553453B2

(12) United States Patent
Smith et al.

(10) Patent No.: US 11,553,453 B2
(45) Date of Patent: Jan. 10, 2023

(54) ACTIVE GEO-LOCATION FOR ORTHOGONAL FREQUENCY DIVISION MULTIPLEX WIRELESS LOCAL AREA NETWORK DEVICES USING ADDITIVE CORRELATION IN THE TIME DOMAIN

(71) Applicant: SR Technologies, Inc., Sunrise, FL (US)

(72) Inventors: Graham K. Smith, Boca Raton, FL (US); Ryan Busser, Fort Lauderdale, FL (US); Olivia Fernandez, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 99 days.

(21) Appl. No.: 17/342,061

(22) Filed: Jun. 8, 2021

(65) Prior Publication Data

US 2022/0110087 A1  Apr. 7, 2022

Related U.S. Application Data

(60) Provisional application No. 63/088,269, filed on Oct. 6, 2020.

(51) Int. Cl.
*H04W 24/10* (2009.01)
*H04W 64/00* (2009.01)
*H04W 56/00* (2009.01)

(52) U.S. Cl.
CPC ......... *H04W 64/006* (2013.01); *H04W 24/10* (2013.01); *H04W 56/009* (2013.01)

(58) Field of Classification Search
CPC . H04W 64/006; H04W 24/10; H04W 56/009; G01S 13/765
See application file for complete search history.

(56) References Cited

U.S. PATENT DOCUMENTS

| | | | | |
|---|---|---|---|---|
| 2012/0309415 | A1* | 12/2012 | Rhoads | G01S 5/0289 455/501 |
| 2018/0070253 | A1* | 3/2018 | Kleinbeck | H04B 17/318 |
| 2021/0311155 | A1* | 10/2021 | Shpak | H04B 7/0617 |

\* cited by examiner

*Primary Examiner* — Chuong A Ngo
(74) *Attorney, Agent, or Firm* — Christopher & Weisberg, P.A.

(57) ABSTRACT

A method in a wireless device (WD) is described. The method is performed for determining a geo-location of a target station using round-trip times (RTTs) of a plurality of signals transmitted by the WD to the target station and a plurality of response signals received from the target station. The method includes determining expected time domain symbols of an expected response signal, and, for each transmitted signal of the plurality of signals, determining a first time, opening a reception window for receiving a response signal, receiving the response signal within the reception window, frequency shifting the expected time domain symbols, and cross-correlating the time domain symbols with the frequency shifted expected time domain symbols. In addition, the method includes determining a peak correlation value, a second time, and the RTT for each one of the transmitted plurality of signals based at least on the first time and the second time.

20 Claims, 16 Drawing Sheets

ACTIVE GEO-LOCATION FOR ORTHOGONAL FREQUENCY DIVISION MULTIPLEX WIRELESS LOCAL AREA NETWORK DEVICES USING ADDITIVE CORRELATION IN THE TIME DOMAIN

CROSS-REFERENCE TO RELATED APPLICATION

This application is related to and claims priority to U.S. Provisional Patent Application Ser. No. 63/088,269, filed Oct. 6, 2020, entitled "ACTIVE GEO-LOCATION FOR ORTHOGONAL FREQUENCY DIVISION MULTIPLEX WIRELESS LOCAL AREA NETWORK DEVICES USING ADDITIVE CORRELATION IN THE TIME DOMAIN," the entirety of which is incorporated herein by reference.

TECHNICAL FIELD

The present disclosure relates to geo-location of wireless devices, and in particular to a method, device and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The location of wireless devices can be determined by various methods. These methods may be classified as active, passive and combined active and passive. In an active location scheme, a device that is determining the location or range, the measuring device, transmits certain packets to the device being located, i.e., the target device, and a common method is to measure the time of arrival (TOA) of the response packet from the target device and compare that to the time of departure (TOD) of the request packet that was transmitted by the measuring device so as to determine the round trip time (RTT).

In such location systems it is common to use multiple measuring devices to determine the location. In such a scheme, simultaneous TOA and/or TOD measurements are taken by different measuring devices situated at different points, and the location of the target device is calculated from these simultaneous measurements.

In an active location scheme, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b, and 110c (referred to collectively herein as "measuring stations" or "measuring receivers" 110). The target station 120 may be a wireless device, such as, for example, an Access Point (AP) that is to be located by the three airborne measuring stations 110. The distance of the target station 120 from measuring station 110a is D1, 130. The distance of the target station 120 from measuring station 110b is D2, 140. The distance of the target station 120 from measuring station 110c is D3, 150. The round trip time, RTT1, determined from the calculation RTT=(TOA−TOD−SIFS), is measured for transmissions from measuring station 110a and this can be used to calculate the distance D1 130 using the formula D1=RTT1*c/2 where c is the speed of light. Similarly, RTT2 and RTT3 measurements result in the determination of distances D2 140 and D3 150. The methods for calculating the location of target station 120 using the distances D1 130, D2 140, and D3 150 are well known.

FIG. 2 is a diagram of an airborne measuring station 110 actively geo-locating target stations 120a, 120b, 120c, and 120d. The target station 120a depicts the example of an outdoor device, target station 120b depicts the example of a device inside a residential home, target station 120c depicts the example of a device inside an automobile, and target station 120d depicts the example of a device inside an apartment. The obstruction losses for the propagations from each of the target stations 120a, 120b, 120c, and 120d to the airborne measuring station 110 will differ and hence the maximum range at which the airborne measuring station 110 can successfully geo-locate the target stations will differ. From the airborne measuring station's 110 perspective, the range will be dependent upon two factors: the transmit power of the ranging packet, which should be such that the target station will successfully receive it, and the receive sensitivity of the airborne measuring station 110 which would be such that the response packet is received successfully. Transmitting the ranging packet at a sufficiently high power is straightforward, e.g., by using a higher power amplifier and/or higher gain antenna, but the receive sensitivity of the airborne measuring station 110 is generally restricted to the noise figure of the receiver.

The signal level, Pr, received at the airborne measuring station 110 is:

$$Pr = Pt + G_1 + G_2 - L_{fs} - Lo \quad (1)$$

Where Pt=Transmit power from the target station 120
$G_1$=Antenna gain at the airborne measuring station
$G_2$=Antenna gain at the target station
$L_{fs}$=Propagation loss, free space
Lo=Obstruction loss The obstruction loss, Lo, for the path from the target station 120a and the airborne measuring station 110 can be assumed to be zero as the target station 120a has a line-of-sight path to the airborne measuring station 110. In contrast, the obstruction losses for the other target stations may, for example, be on the order of 10 dB for target station 120b, 6 dB for target station 120c and 15-20 dB for target station 120d. The range of the airborne measuring station 110 to successfully detect the response packets from each of these target stations is limited due to the fixed sensitivity of the airborne measuring station 110 which is, in the general sense, restricted by the noise figure of the receiver and the need to receive a packet without errors.

SUMMARY

According to one aspect of the present disclosure, a method in a wireless device (WD) is described. The method is performed at least to determine a geo-location of a target station using round-trip times (RTTs) of a plurality of signals transmitted by the WD to the target station and a plurality of response signals received from the target station corresponding to the plurality of signals transmitted by the WD. The method includes determining expected time domain symbols of an expected response signal and transmitting the plurality of signals.

The method further includes, for each transmitted signal of the plurality of signals, determining a first time is determined, where the first time is a time of transmission of each transmitted signal, opening a reception window for receiving a response signal corresponding to one transmitted signal, receiving the response signal within the reception window, where the received response signal includes at least time domain symbols. Further, the method includes, for each transmitted signal of the plurality of signals, frequency shifting the expected time domain symbols of the expected response signal, and while the reception window is open, cross-correlating the time domain symbols of the received response signal with the frequency shifted expected time domain symbols. The cross-correlation generates a set of cross-correlation outputs.

In addition, the method includes determining a peak correlation value based at least in part on the set of cross-correlation outputs, determining a second time that is a time associated with the peak correlation value, and determining the RTT for each one of the transmitted plurality of signals based at least on the first time and the second time to determine the geo-location of the target station.

In some embodiments, the set of cross-correlation outputs of the open reception window of each signal are summed based at least on a predetermined criterion, and a set of rolling sums are determined from the summed set of cross-correlation outputs to determine the peak correlation value.

In some other embodiments, the transmitted plurality of signals are orthogonal frequency diversity modulation (OFDM) signals transmitted in a burst of N transmissions. The transmitted plurality of signals has a time between each transmission and a wait time between the burst and a subsequent burst.

In one embodiment, each transmitted signal is one of a request-to-send (RTS) signal and a data null signal. In another embodiment, the expected time domain symbols of the expected response signal include at least one of a OFDM preamble and a signal field.

In some embodiments, cross-correlating the time domain symbols of the received response signal is performed in a set of branches. Each branch of the set of branches tunes to a different frequency offset to cover a range of carrier frequency offsets. In addition, summing the set of cross-correlation outputs is performed per each branch of the set of branches, and determining the set of rolling sums is performed for each branch of the set of branches.

In some other embodiments, the predetermined criterion includes at least one of a plurality of samples, a plurality of frequency shifts, and the reception window of each transmitted signal. Summing the set of cross-correlation outputs is performed for any one of each sample of the plurality of samples, each frequency shift of the plurality of frequency shifts, and the reception window of each transmitted signal.

In one embodiment, determining the set of rolling sums is based at least on an amount of samples in a rolling sum window, a number of samples in the reception window, and a number of packets in a burst.

In another embodiment, the method further includes detecting an end of transmission of the plurality of signals and determining the set of rolling sums is performed after the end of transmission of the plurality of signals is detected.

According to another aspect of the present disclosure, a wireless device (WD) is described. The WD is configured to determine a geo-location of a target station using round-trip times (RTTs) of a plurality of signals transmitted by the WD to the target station and a plurality of response signals received from the target station corresponding to the plurality of signals transmitted by the WD. The WD includes a transceiver configured to transmit the plurality of signals and receive a response signal within a reception window for each transmitted signal of the plurality of signals. The received response signal includes at least time domain symbols.

The WD also includes processing circuitry that is in communication with the transceiver and configured to determine expected time domain symbols of an expected response signal and transmit the plurality of signals. The processing circuitry is also configured to, for each transmitted signal of the plurality of signals, determine a first time that is a time of transmission of each transmitted signal, open the reception window for receiving the response signal corresponding to one transmitted signal, and frequency shift the expected time domain symbols of the expected response signal. Further, the processing circuitry is also configured to, for each transmitted signal of the plurality of signals, while the reception window is open, cross-correlate the time domain symbols of the received response signal with the frequency shifted expected time domain symbols. The cross-correlation generates a set of cross-correlation outputs.

The processing circuitry is further configured to determine a peak correlation value based at least in part on the set of cross-correlation outputs, determine a second time that is a time associated with the peak correlation value and determine the RTT for each one of the transmitted plurality of signals based at least on the first time and the second time to determine the geo-location of the target station.

In some embodiments, the processing circuitry is also configured to sum the set of cross-correlation outputs of the open reception window of each signal based at least on a predetermined criterion and determine a set of rolling sums from the summed set of cross-correlation outputs to determine the peak correlation value.

In some other embodiments, the transmitted plurality of signals are orthogonal frequency diversity modulation (OFDM) signals transmitted in a burst of N transmissions. The transmitted plurality of signals has a time between each transmission and a wait time between the burst and a subsequent burst.

In one embodiment, each transmitted signal is one of a request-to-send (RTS) signal and a data null signal. In another embodiment, the expected time domain symbols of the expected response signal include at least one of a OFDM preamble and a signal field.

In some embodiments, cross-correlating the time domain symbols of the received response signal is performed in a set of branches. Each branch of the set of branches tunes to a different frequency offset to cover a range of carrier frequency offsets. In addition, summing the set of cross-correlation outputs is performed per each branch of the set of branches, and determining the set of rolling sums is performed for each branch of the set of branches.

In some other embodiments, the predetermined criterion includes at least one of a plurality of samples, a plurality of frequency shifts, and the reception window of each transmitted signal. Summing the set of cross-correlation outputs is performed for any one of each sample of the plurality of samples, each frequency shift of the plurality of frequency shifts, and the reception window of each transmitted signal.

In one embodiment, determining the set of rolling sums is based at least on an amount of samples in a rolling sum window, a number of samples in the reception window, and a number of packets in a burst.

In another embodiment, the processing circuitry is further configured to detect an end of transmission of the plurality of signals and determine the set of rolling sums is performed after the end of transmission of the plurality of signals is detected.

In another aspect of the present disclosure, a measuring station is described. The measuring station is configured to determine a geo-location of a target station using round-trip times (RTTs) of a plurality of signals transmitted by the measuring station to the target station and a plurality of response signals received from the target station corresponding to the plurality of signals transmitted by the measuring station. The measuring station comprises a transceiver configured to transmit the plurality of signals and receive a response signal within a reception window for each transmitted signal of the plurality of signals. The received response signal includes at least time domain symbols.

The measuring station further includes processing circuitry that is in communication with the transceiver and is configured to determine expected time domain symbols of an expected response signal. The processing circuitry is further configured to, for each transmitted signal of the plurality of signals, determine a first time that is a time of transmission of each transmitted signal, open the reception window for receiving the response signal corresponding to one transmitted signal, and frequency shift the expected time domain symbols of the expected response signal. The processing circuitry is further configured to, for each transmitted signal of the plurality of signals, while the reception window is open, cross-correlate the time domain symbols of the received response signal with the frequency shifted expected time domain symbols. The cross-correlation generates a set of cross-correlation outputs.

In addition, the processing circuitry is configured to sum the set of cross-correlation outputs of the open reception window of each signal based at least on a predetermined criterion, determine a set of rolling sums from the summed set of cross-correlation outputs to determine a peak correlation value, determine the peak correlation value based at least in part on the set of cross-correlation outputs, determine a second time that is a time associated with the peak correlation value, and determine the RTT for each one of the transmitted plurality of signals based at least on the first time and the second time to determine the geo-location of the target station.

In some embodiments, the cross-correlating the time domain symbols of the received response signal is performed in a set of branches. Each branch of the set of branches tunes to a different frequency offset to cover a range of carrier frequency offsets. In addition, summing the set of cross-correlation outputs is performed per each branch of the set of branches, and determining the set of rolling sums is performed for each branch of the set of branches. The predetermined criterion includes at least one of a plurality of samples, a plurality of frequency shifts, and the reception window of each transmitted signal. Further, summing the set of cross-correlation outputs is performed for any one of each sample of the plurality of samples, each frequency shift of the plurality of frequency shifts, and the reception window of each transmitted signal.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

This application incorporates U.S. patent application Ser. No. 16/708,923 and U.S. patent application Ser. No. 16/782,762 by reference in their entireties. As an initial matter, it is noted that improving the effective sensitivity of the measuring receiver as compared with known arrangements will increase the range at which target stations 120 may be detected and located as compared to known methods. In one embodiment of the present disclosure, a single airborne measuring station 110 is used. The present disclosure provides methods and devices that increase the range of active geo-location from the airborne measuring station 110 as compared to known methods. In some embodiments, the disclosed method applies to the reception of orthogonal frequency division multiplex (OFDM) acknowledgement (ACK) and clear-to-send (CTS) packets in response to data null and request-to-send (RTS) packets respectively, in the Wi-Fi bands.

Figure 3:
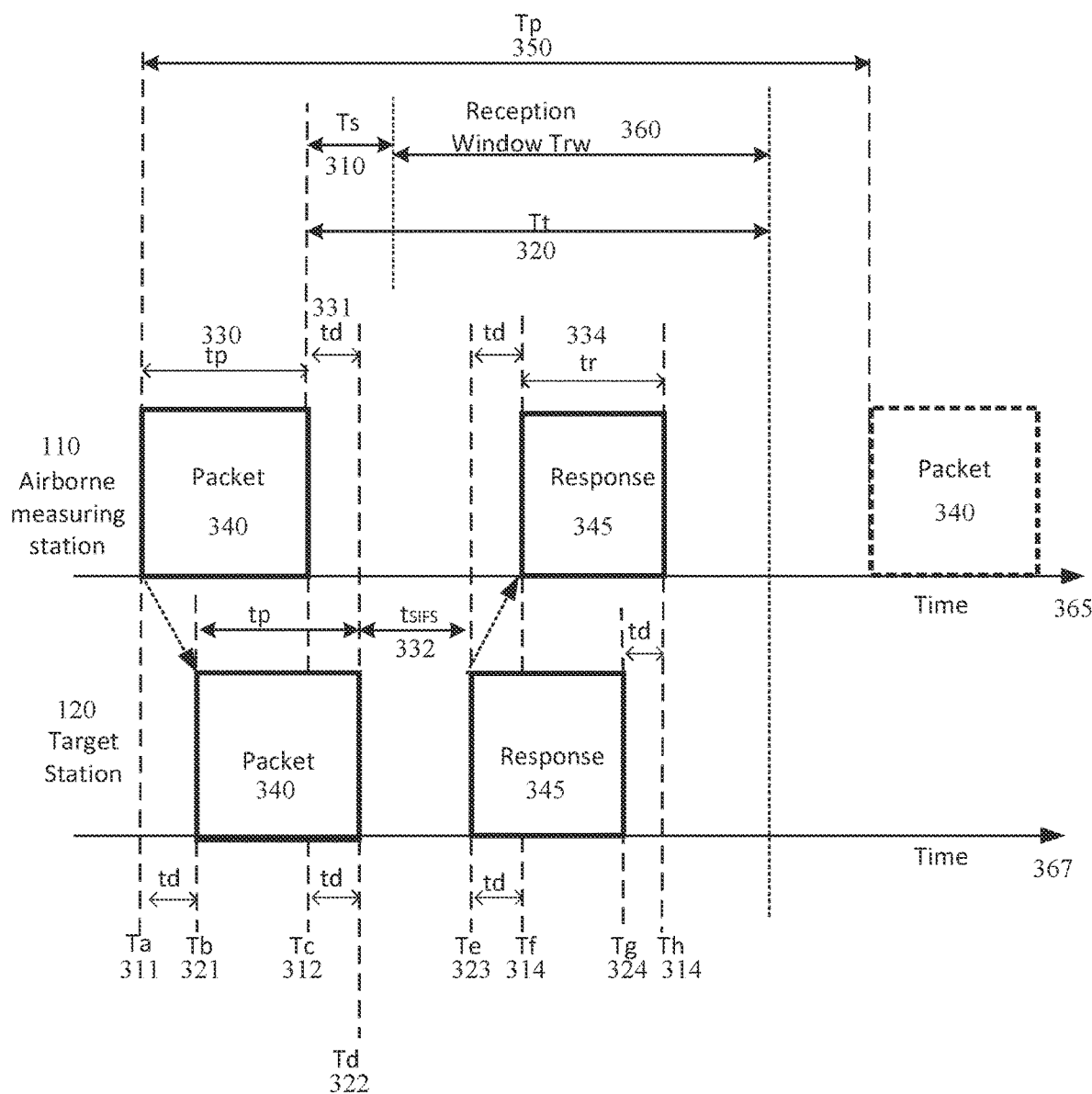
FIG. 3 is a timing diagram that describes the ranging method of the present disclosure that may be used to determine the distance between two wireless devices.

FIG. 3 is a timing diagram that describes a ranging transmission method of the present disclosure that may be used to determine the distance between two wireless devices: an airborne measuring station 110 and a target station 120. Time axis 365 is the time axis for the airborne measuring station 110 and time axis 367 is the time axis for the target station 120. At time Ta 311, airborne measuring station 110 starts the transmission of ranging packet 340 which is addressed to target station 120. After a time-delay of td, at time Tb 321, target station 120 starts to receive ranging packet 340. At time Tc 312, airborne measuring station 110 completes the transmission of ranging packet 340 and at time Td 322, target station 120 completes the reception of ranging packet 340. The time difference between Tc 312 and Td 322 is td 331, the propagation time for the packet to travel from airborne measuring station 110 to target station 120. Note that the time differences (Tc−Ta) and (Td−Tb) are both the duration tp 330 of the transmitted ranging packet 340.

Target station 120 transmits the response packet 345 at time Te 323. Assuming that the response packet 345 is an ACK or a CTS packet in reply to the received ranging packet 340, time Te 323 ideally will be at a time $t_{SIFS}$ 332 after time Td 322, where $t_{SIFS}$ 332 is the SIFS time as defined in the IEEE 802.11 standard. At time Tf 314, airborne measuring station 110 starts to receive the response packet 345. At time Tg 324, target station 120 completes the transmission of the response packet 345 and at time Th 314, airborne measuring station 110 completes receiving the response packet 345. Note that the time differences (Tb−Ta), (Td−Tc), (Tf−Te), and (Th−Tg) are all equal and have the value td 331 which is the propagation time for the packet and response to travel between the two stations.

At airborne measuring station 110, the time of a packet at the point when the frame check has completed, may be recorded. Hence, the time for the transmission of ranging packet that is recorded, is Tc 312, and the time that is recorded for the reception of the response packet 345 is Th 314. In order to calculate the value of td, it is desirable to know the duration tr of the response packet 345. Calculating the duration tr 334 is straightforward as the duration of the response packet 345 is defined in the Standard. In practice therefore, airborne measuring station 110 can calculate the value of td from expression (3):

$$td=(Th-Tc-tr-t_{SIFS})/2 \qquad (2)$$

and hence the corresponding distance, $D=td*c$      (3)

A reception window Trw 360 may be defined which may be related to the range of the target station 120. The reception window starts at time Ts 310 after the end of the transmission, Tc 312 of ranging packet 340 and ends at time Tt 320 after the end of the transmission, Tc 312 of ranging packet 340. As an example, the reception window Trw may be set to start at time Ts 310, 10 µs after time Tc 312, and end at time Tt 320, 60 µs after time Tc 312. In this example the duration of the reception window Trw 360 is 50 µs.

Airborne measuring station 110 may transmit ranging packets 340 at time intervals of Tp 350.

Figure 4:
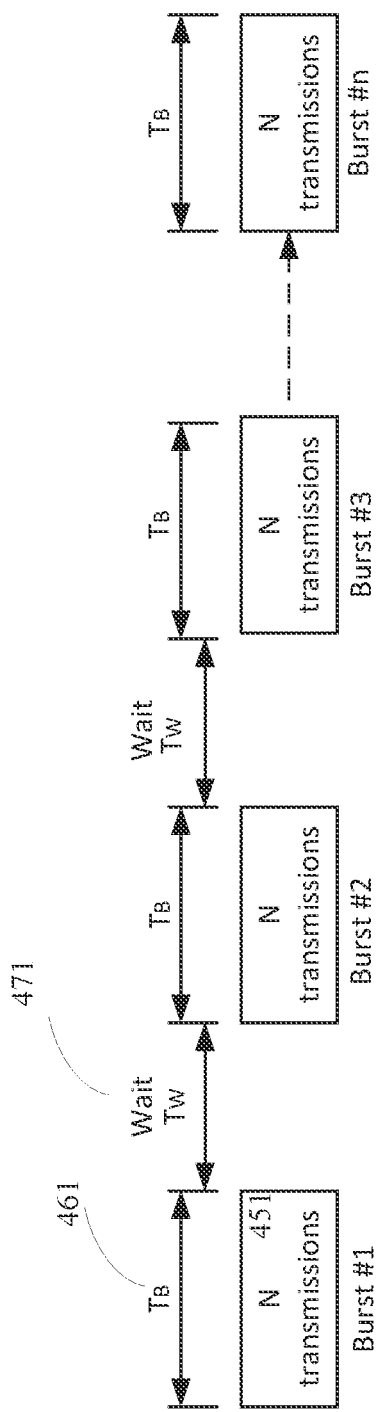
FIG. 4 is a timing diagram of a series of bursts of transmissions of the ranging packets.

FIG. 4 is a timing diagram of a series of bursts of transmissions of the ranging packets 340. In one embodiment of this disclosure, a "burst", 451, consisting of a preset number N of transmissions of packets 340 from airborne measuring station 110, may be sent followed by a "wait" period, Tw 471. This sequence may continue until a command may be issued to terminate the transmissions. Within each burst, each of the N transmissions may be separated by a preset time interval, Tp 350. The duration $T_B$ 461 of each burst will therefore be N·Tp. For example, a burst may consist of 100 transmissions of packets 340, N=100, from airborne measuring station 110, each transmission, say, 1 ms apart, Tp=1 ms, followed by a wait period of, say, 30 ms, Tw=30 ms, after which another burst of 100 transmissions may be sent. In this example the duration $T_B$ 461 of each burst is 100 ms, i.e., $T_B$=100 ms.

Figure 1:
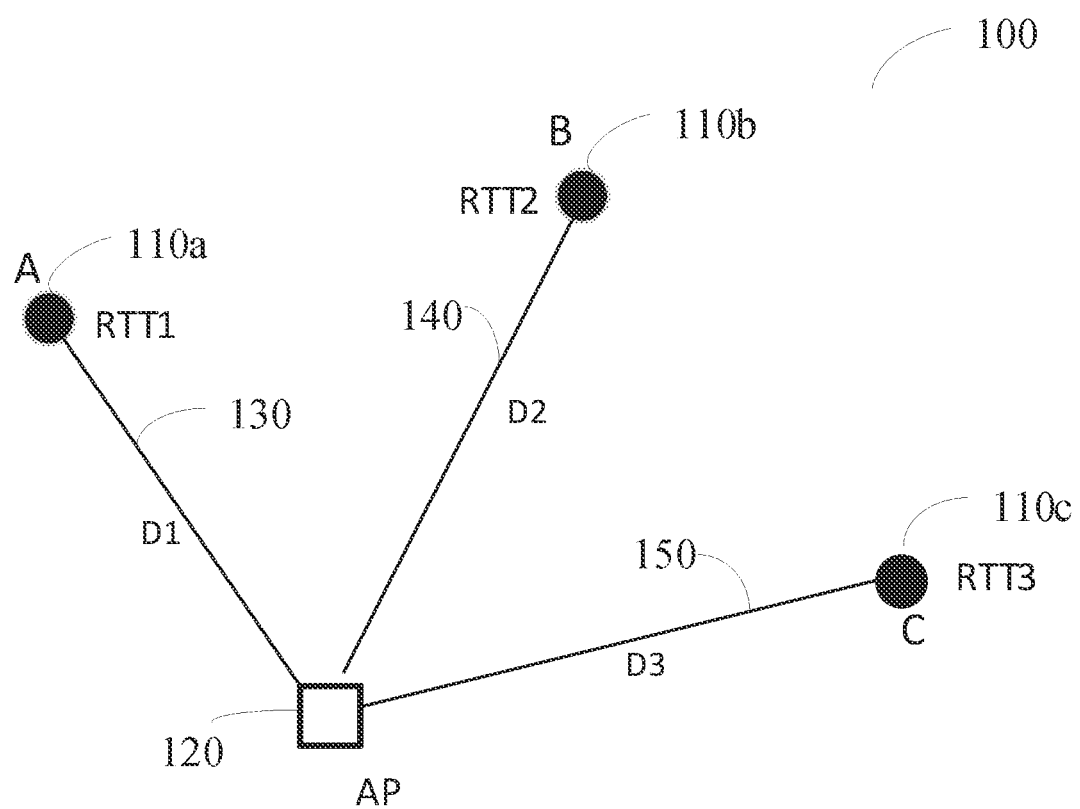
FIG. 1 is a diagram of a typical location system which includes three measuring stations.
Figure 2:
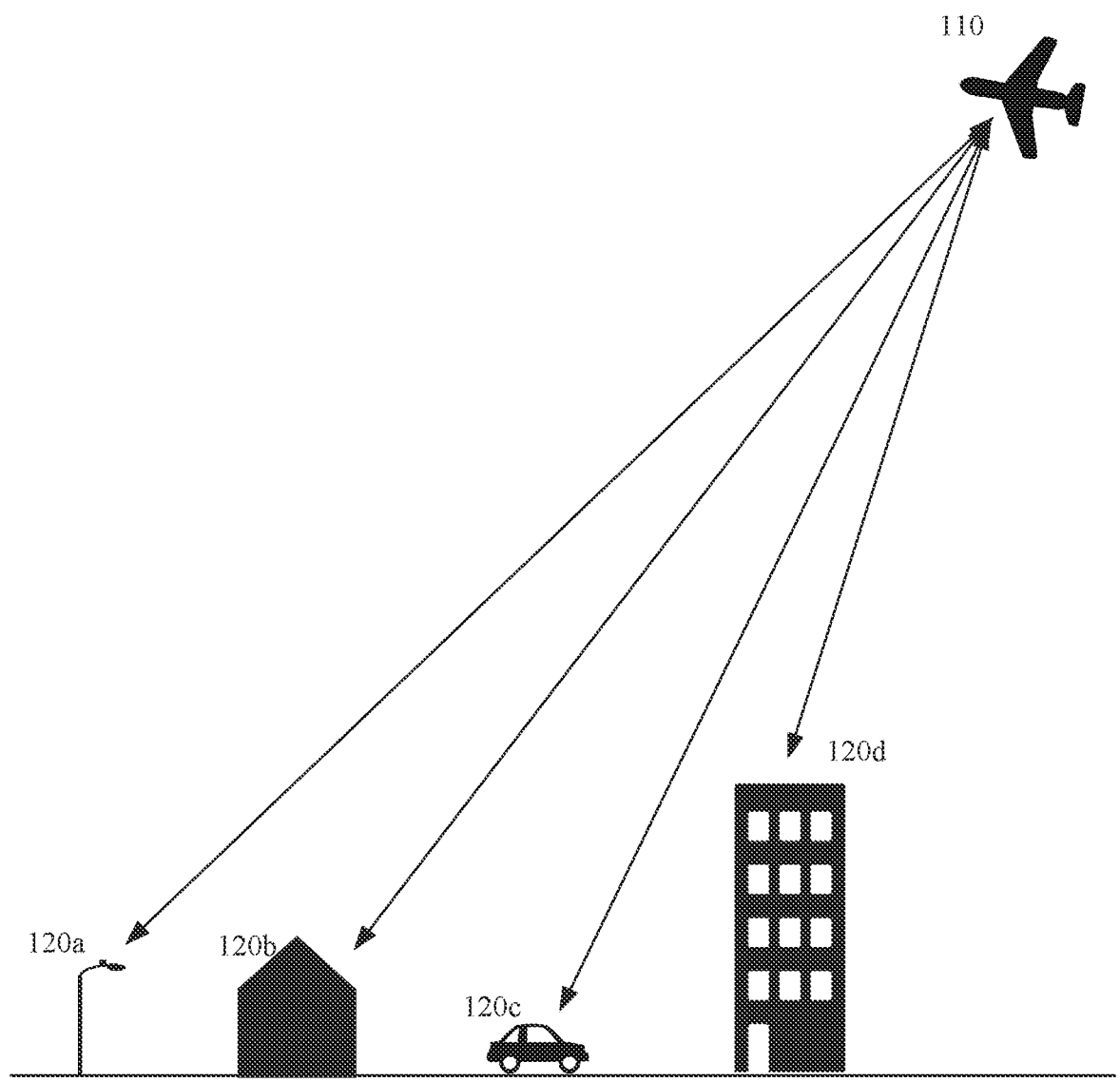
FIG. 2 is a diagram of an airborne measuring station actively geo-locating target stations.

In the case that there is a single airborne measuring station 110, then, with reference to FIG. 1, the three measuring distances D1 130, D2 140, and D3 150 will be taken at different points in time. In this case the airborne measuring station 110 may be flying over an area and periodically transmitting the ranging packets 340, receiving the response packets 345 and calculating the delay time td. Over time, the location of target station 120 can be calculated with increasing accuracy as more measurements are taken by the airborne measuring station 110 from varying positions. Such calculations are known.

As mentioned previously, the packet exchange may be any pair of packets where an automatic response packet is sent. Commonly used packets in Wi-Fi include an RTS/CTS exchange and a Data (null)/ACK exchange.

In one embodiment of the present disclosure, a single airborne measuring station 110 is used. A method and devices are disclosed that increase the range of active geo-location from the airborne measuring station 110 as compared with prior methods and systems by increasing the effective receive sensitivity of the airborne measuring station 110. In some embodiments, the disclosed method applies to the reception of OFDM ACK and CTS packets in response to data null and RTS packets respectively.

The OFDM waveform preamble is defined in the IEEE Standard as a 320-sample sequence composed of a Short Training Field and Long Training Field, each 160 samples long. The Short Training Field (STF) is typically used by receivers for initial packet detection, automatic gain control (AGC) convergence, and coarse synchronization. The Long Training Field (LTF) is typically used by receivers to refine synchronization and to estimate the channel frequency response. The LTF waveform was designed to have good autocorrelation properties with reasonable peak-to-average power.

Nonlimiting examples of two correlation schemes that may be utilized to detect OFDM waveforms include cross correlation and autocorrelation. Cross correlation compares received samples to a local copy of the waveform searching for a match. Autocorrelation compares recently-received samples to previously-received samples searching for a known periodicity. Cross correlation has an advantage of only considering one vector of noisy samples, computing the correlation metric by multiplying this vector by a noiseless copy of the transmitted waveform. However, cross correlation suffers in the presence of realistic wireless degradations including carrier frequency offset CFO and multipath fading. Autocorrelation is robust to CFO and multipath fading as each copy of a training symbol is subjected to identical degradations, thereby preserving the waveform's underlying periodicity. However, autocorrelation suffers from the extra noise admitted by computing a correlation metric using two vectors of "noisy" received samples.

Cross correlation provides the better performance with respect to receive sensitivity than autocorrelation, but the performance will degrade significantly in the presence of CFO. The IEEE 802.11 Standard requires transmit center frequency accuracy of ±20 ppm.

Decoding the OFDM payload is further complicated by scrambling. According to the IEEE 802.11 Standard, a pseudo-random 7-bit scrambling seed is used for each 802.11 OFDM packet. The OFDM receiver recovers this seed from the scrambled Service field in the first OFDM symbol following the Signal field. However, if a bit error occurs in the decoded Service field, the descrambled payload will be totally in error. The probability of a bit error in the Service field becomes higher as the signal to noise ratio, SNR, decreases. Hence, if attempting to detect an OFDM CTS or ACK packet at low or negative SNR levels, there is a high probability that one or more bits in the Service field may be in error and the scrambler seed may not be recoverable.

As discussed above, a preamble detector using cross correlation provides the better SNR sensitivity or receive signal sensitivity, but the sensitivity degrades with CFO. A brute force solution to the CFO problem is described that includes a branched correlator using multiple parallel cross correlators, "branches", each tuned to a different CFO within the range of offsets permitted by the IEEE 802.11 Standard.

Assuming a carrier frequency of 5.815 GHz, channel 161 at the top end of the Wi-Fi GHz band, a 20-ppm error is 116.3 kHz. The time for 320 samples is nominally 16 µs but with a 1 ppm error, this time has an error of 0.00465 µs, about 9% of a sample error for the last sample. Over an ACK packet of 880 samples, the 1 ppm error is 0.0128 µs, a 25% sample error for the last sample. Hence, in order to not excessively degrade the cross correlation of the 320 samples of the preamble, the CFO error may be restrained to be less than, say, 2.5 ppm, and for the full 880 samples of the ACK packet, the CFO error may be restrained to be about 1.25 ppm. In one embodiment of this disclosure the number of parallel cross correlator branches selected is eight resulting in 8 parallel correlators which may, for example, be tuned to [−17.5, −12.5, −7.5, −2.5, +2.5, +7.5, +12.5, +17.5] ppm. In another embodiment of this disclosure the number of branches selected is sixteen, resulting in 16 parallel detectors, which may, for example, be tuned to [−18.75, −6.25, −13.75, −11.25, −8.75, −6.25, −3.75, −1.25, +1.25, +3.75, +6.25, +8.75, +11.25, +13.75, +16.25, +18.75] ppm.

Figure 5:
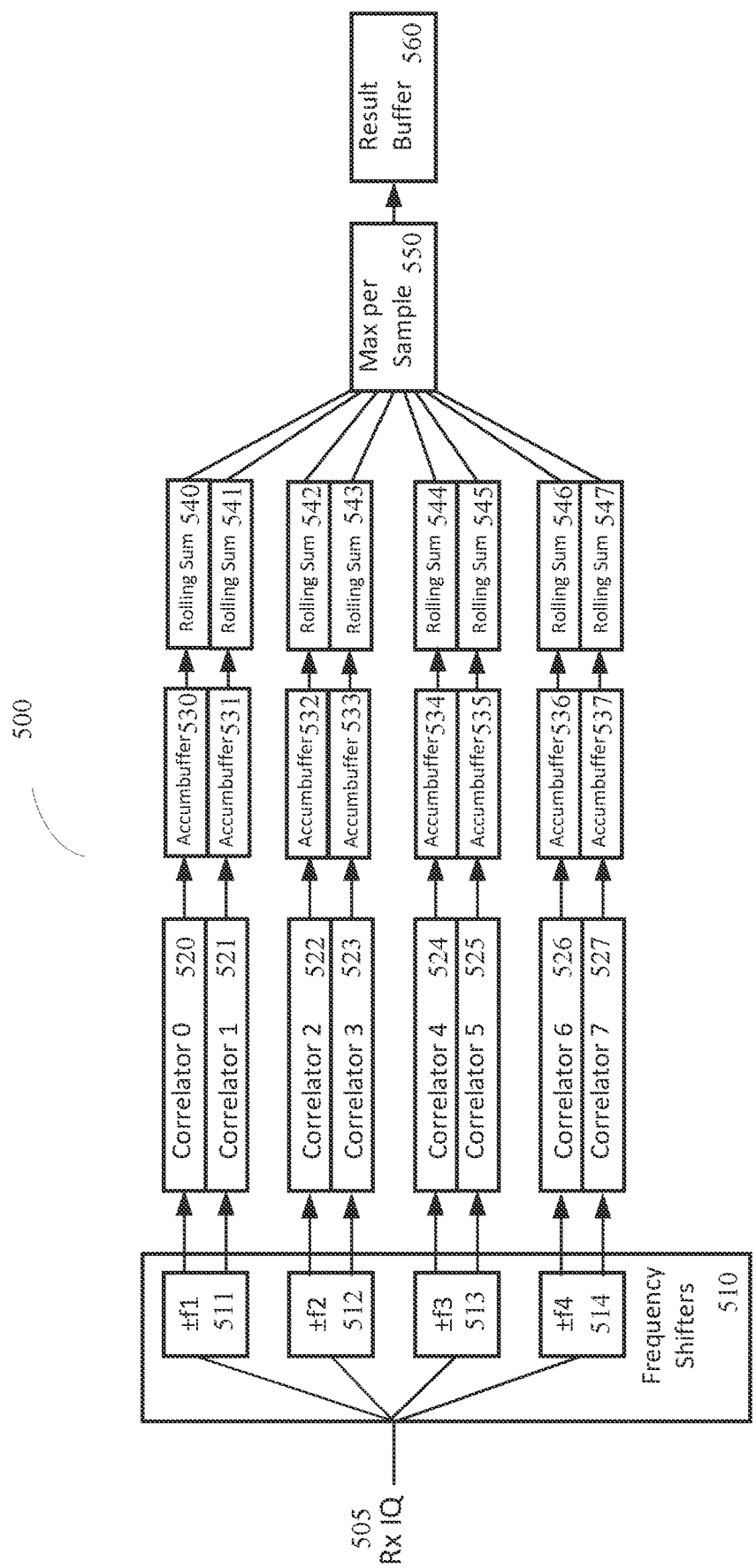
FIG. 5 is a functional block diagram of an exemplar OFDM branched correlator for one embodiment of this disclosure where the number of parallel cross correlator branches selected is eight.

FIG. 5 is a functional block diagram of an exemplar OFDM branched correlator 500 for one embodiment of this disclosure where the number of parallel cross correlator branches selected is eight. The complex received baseband sampled stream 505 is inputted to a frequency shifter block 510. The frequency shifter block 510 comprises four frequency shifters 511, 512, 513, and 514. Each frequency shifter 511, 512, 513, and 514 is configured with an independent frequency shift value and outputs two sample streams, one with a positive frequency shift and one with a negative frequency shift. The eight frequency-shifted sample streams are each fed into independent correlation blocks 520, 521, 522, 523, 524, 525, 526, and 527 implementing a complex cross correlation that in one implementation of this disclosure searches for the OFDM preamble and, in another implementation of this disclosure, searches for the preamble and the Signal field of the 802.11 OFDM response packet 345. Each correlator 520 to 527 re-computes a complete complex cross correlation in every sample period. In order to combine across reception windows, these complex values cannot be directly summed since the phase of each correlation peak is arbitrary and unknowable. Thus, the complex-valued output of the correlator in each branch is reduced to a real magnitude. The output of each correlator 520 to 527 is then inputted into an accumulation buffer, 530 to 537, respectively, where the correlation values for each sample are summed for each reception window n in the burst of N transmissions. This summing scheme is referred to as "additive correlation" and is described below with reference to FIG. 9. At the end of a burst of N transmissions, as described above with reference to FIG. 4, a "rolling sum" is applied to each additive correlation in each branch, 540 to 547. As discussed below with reference to FIGS. 10, 11 and 12, Wi-Fi target stations, 120, in the general sense, exhibit a dither in their turnaround time, $t_{SIFS}$ 332, resulting in a jitter between the relative timing of the correlation peaks between reception windows. The rolling sum is used to overcome this jitter. The details of the rolling sum are discussed below with reference to FIGS. 10, 11 and 12. The maximum value for each corresponding sample in the eight rolling sum outputs, 540 to 547, is selected at block 550, and the final result for the burst of N transmissions is stored in the result buffer 560.

The IEEE 802.11 Standard allows frequency offsets of ±20 ppm. In the branched correlator example depicted in FIG. 5 an eight-branch architecture is shown so that evenly distributed branches would achieve acceptable performance across this ±20 ppm range at the higher 5 GHz center frequencies for the preamble and Signal field parts of the OFDM response signal 340. The eight branches may be tuned at 5 ppm spacing for the received channel center frequency. In another embodiment the number of branches may be increased to 16 and the branches may be tuned at 2.5 ppm spacing so as to further reduce errors due to CFO. In another embodiment the center frequencies of the branches may be programmable, and the center frequencies may be changed between bursts 451 such that even tighter ppm spacing may be used.

Figure 6:
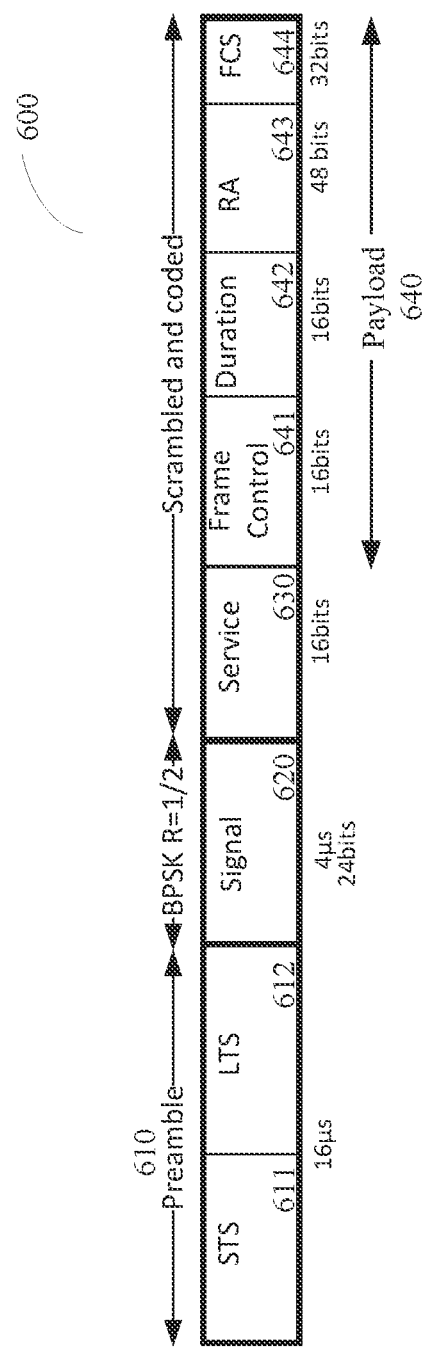
FIG. 6 is the format for CTS and ACK OFDM packets which may be the response packet.

FIG. 6 is a format for CTS and ACK OFDM packets 600, which may be the response packet 345. As described in the IEEE 802.11 Standard, the OFDM preamble 610, comprising the short timing sequence (STS) 611 and the long timing sequence (LTS) 612, is followed by the Signal field 620. The Signal field 620 is modulated BPSK (binary phase shift keying) with rate ½ convolutional coding. The Signal field 620 consists of the following sub-fields: Rate (4 bits), Reserved (1 bit), Length (12 bits) Parity (1 bit), and Tail (6 bits). The values of each bit in the Signal field 620 for a CTS or ACK packet, responding to an RTS or data null packet, are known. There are a total of 48 coded data bits in the OFDM Signal field 620. These bits represent a unique 48-bit sequence for 6 Mbps OFDM ACK and CTS packets. The Signal field 620 is followed by the 16-bit Service field 630 with bits 0-6 set to zero followed by 9 reserved bits. The Service field 630 is followed by the payload 640 comprising the frame control field 641, the duration field 642 the receiver address RA 643 and the frame check sum FCS 644. Bits 0-6 of the Service field 630 are transmitted first and are used to synchronize the descrambler in the receiver, as described in the IEEE 802.11 Standard. The transmit 7-bit scrambler seed is random but because the first 7 pre-scrambled bits are zero, the receiver can effectively recover the seed. If, however, there is a bit error in those first 7 bits, then the receiver cannot effectively recover the seed and cannot decode correctly the rest of the packet following the Service field 630, including, in particular, the payload containing the frame control field 641 and the RA field 643. Expressed another way, the Signal field is not scrambled and therefore the time domain symbols of the preamble and the Signal field are completely determinable whereas the rest of the packet is scrambled with one of 127 possible versions.

In the time domain, the preamble 610 is 320 samples and the Signal field 620 is 80 samples. With reference to the IEEE 802.11-2016 Standard, Table I-4 is the "Time domain representation of the short sequence", Table I-6 is the "Time domain representation of the long sequence" and Table I-12 is the "Time domain representation of the SIGNAL field".

In one embodiment of this disclosure the 320-sample preamble 610 is correlated in each branch of the branch correlator 500. In another embodiment of this disclosure, the 400 samples of the preamble 610 and the Signal field 620 are correlated in each branch of the branch correlator 500. In both these embodiments the time domain samples are known a priori as depicted in Tables I-4, I-6 and I-12 of the IEEE 802.11-2016 Standard.

A method and devices are disclosed that correlate the preamble or the preamble and Signal field of each received response packet 345 during a burst 451.

The probability of a symbol error, Ps, for a binary phase modulation, may be calculated using:

$$Ps = 0.5 \, erfc\sqrt{S/N} \quad (4)$$

Where "erfc" is the Gauss complimentary error function
S/N is signal to noise ratio The received signal level may be calculated using the standard formula:

$$Pr = 10 \log(1000 \, K \, T) + 10 \log BW + NF + SNR \, dBm \quad (5)$$

Where K is Boltzmann's constant
T is temperature in degrees Kelvin
BW is the occupied bandwidth, Hz
NF is the noise figure, dB
For T=20° Celsius, 10 log (1000 K T)=−174 dBm
BW=20 MHz for OFDM and assuming NF=3 dB,
from (5) Pr=−98+SNR dBm.

As discussed above with reference to FIG. 6, if all the symbols of the preamble and Signal field CTS or ACK are known in advance, then the received symbols may be compared to the expected symbols. If enough of the symbols match, then a decision may be made that the CTS or ACK had indeed been detected. This technique is known as correlation where the decision may be based upon a correlation threshold.

In the general sense, cross-correlation works by passing the locally known pattern of symbols across the received noisy pattern of symbols, and if the symbols agree, they add, if not they subtract. For a packet of M symbols, M·Ps symbols will not match and M·(1−Ps) will match. Hence, Correlation=(Match−Mismatch)/Total, or $$Correlation = (M - 2 \, M \, Ps)/M = (1 - 2 \, Ps) \quad (6)$$

For example, for Ps=0.2, Correlation=(1−2×0.2)=0.6 or 60%. Note that for pure noise, Ps=0.5 and hence M/2 symbols will agree (match), and M/2 symbols will not agree (mismatch), and correlation will be 0%.

If the known 320 symbols of the OFDM preamble are correlated across the raw received symbols, then it is possible to detect an OFDM preamble that is well below the noise level.

For a given SNR, the symbol error Ps may be calculated using equation (5) and the correlation calculated using equation (6). The variance and standard deviation, σ, of the mismatched symbols may be calculated:

$$\sigma^2 = M \cdot Ps(1-Ps)$$

$$\sigma = \sqrt{M \cdot Ps(1-Ps)} \quad (7)$$

For M symbols, the number of mismatched symbols is M·Ps, with a standard deviation of σ. Hence, mismatched bits=M·Ps±σ, and the number of matched bits is M−(M·Ps±σ). Thus, the correlation from equation (7), expressed as mean±standard deviation, is given by:

$$Correlation = (M-(M \, Ps \pm \sigma) - (M \, Ps \pm \sigma))/M = 1 - 2 \, Ps \pm 2\sigma/M \quad (8)$$

Comparing (8) to (7), the following associations can be made:

$$Correlation \, mean = (1 - 2Ps) \quad (9)$$

$$and \, Correlation \, standard \, deviation = 2\sigma/M. \quad (10)$$

Noise has a symbol error rate, Ps=0.5 with a mean of zero and, from equation (7), $$\sigma = \sqrt{M/4} \text{ and, from equation} \quad (10)$$

$$noise \, correlation \, standard \, deviation = \sqrt{1/M} \quad (11)$$

Hence, the effective "3σ correlation" for thermal noise is $$3\sqrt{1/M},$$

i.e., for M=304, thermal noise 3σ correlation=0.172 or 17.2%.

Figure 7:
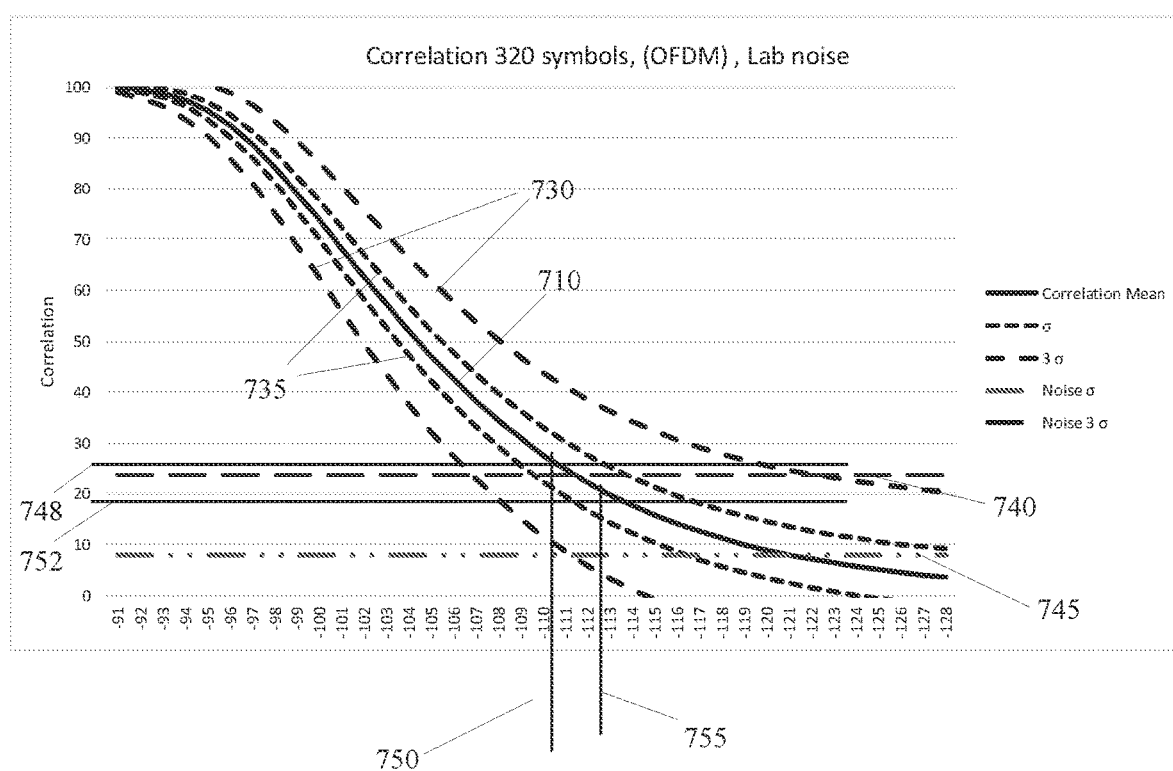
FIG. 7 is a graph of Correlation % versus received signal power Pr for M=320 symbols under laboratory, "Lab", conditions.

FIG. 7 is a graph of Correlation % versus received signal power Pr for M=320 symbols under laboratory, "Lab", conditions. For a given received signal strength Pr, the SNR is calculated using equation (5) assuming a noise figure of 3 dB. The SNR is used to determine the symbol error rate Ps using equation (4). The correlation mean, 710, is calculated using equation (9). The one σ correlations 735 and the three σ correlations 730 plots are calculated using equations (9) and (10). The 3 σ and one σ values for noise, 24.3% and 8.1%, 740 and 745, respectively, are calculated using formula (11) and then multiplied by $\sqrt{2}$ to account for the 3 dB noise figure.

The correlation may be performed for the duration of a reception window Trw 360. As an example, the duration of a reception window may be 50 μs and at a typical sampling rate of 20 MS/sec there may be 1000 correlation values in the reception window of which only one would correspond to the wanted. In order to be detected, the correlation peak of the wanted signal, the response packet 345, must be greater than the highest peak due to noise, but there are correlations due to noise. The Gumbel distribution may be used to describe the distribution of the maximum of a large sample size n, where, for example n=1000. The probability that the singular signal correlation will exceed the highest of the all of noise correlations is found by integrating, over all correlations, the Gumbel probability distribution (of highest noise correlation) times the probability that the wanted signal exceeds that correlation, i.e., (1−CDF).

The probability, Pw, that the wanted correlation is greater than the peak noise correlation is $$P_w = \int \mathcal{G}\, u(x;\mu,\beta) \cdot [1 - \mathcal{F}(x)] dx \qquad (9)$$

Where $\mathcal{G}\, u(x;\mu,\beta)$ is the Gumbel PDF of noise with location μ, scale β for a value of n, And $[1-\mathcal{F}(x)]$ is the complement cumulative distribution function (1−CDF) of the normal distribution of the wanted signal correlation with mean and standard deviation as per equations (9) and (10).

Table 1 shows the probability of the wanted correlation peak being higher than the maximum peak of the noise correlations as the correlation mean varies for thermal, lab and suburban noise conditions, for n=1000. The noise is assumed to be 3 dB higher than thermal for "lab" conditions, and 6 dB higher than thermal for suburban conditions.

TABLE 1

Probability that the Wanted correlation is highest

| Corr Mean % | Prob Wanted Peak Wins % | | |
|---|---|---|---|
| | Thermal | Lab | Suburban |
| 90 | 100 | 100 | 100 |
| 85 | 100 | 100 | 100 |
| 80 | 100 | 100 | 100 |
| 75 | 100 | 100 | 100 |
| 70 | 100 | 100 | 100 |
| 65 | 100 | 100 | 100 |
| 60 | 100 | 100 | 100 |
| 55 | 100 | 100 | 99 |
| 50 | 100 | 100 | 97 |
| 45 | 100 | 100 | 88 |
| 40 | 100 | 98 | 67 |
| 35 | 100 | 91 | 38 |
| 30 | 97 | 72 | 14 |
| 25 | 86 | 41 | 3 |
| 20 | 59 | 15 | 0 |
| 15 | 27 | 3 | 0 |
| 10 | 7 | 0 | 0 |
| 5 | 1 | 0 | 0 |

Referring again to FIG. 7, in a burst, 451, of N=100 transmissions, with reference to Table 1, for σ correlation mean of 26%, 748, there is about a 50% probability that the wanted peak is detected, or, in a burst of 100 transmissions, the wanted peak will be detected 50 times and a noise peak will win 50 times. This corresponds to a signal level of −about 110 dBm 750. For a correlation mean of about 18% 752, there is a 10% probability that the wanted peak is detected, corresponding to a signal level of about −113 dBm 755. Dropping the correlation threshold from 26% to 18% increases the sensitivity by about 3 dB but out of the 100 results, only 10 will be the wanted peak and 90 will be noise peaks.

FIG. 7 represents the results using equations (4) to (10) which assume laboratory noise. In many scenarios the airborne measuring station 110 may be receiving many different signals from a large area on the ground, and the background noise level may be significantly higher than thermal noise and may be variable dependent upon the environment, i.e., open, rural, suburban or urban.

Figure 8:
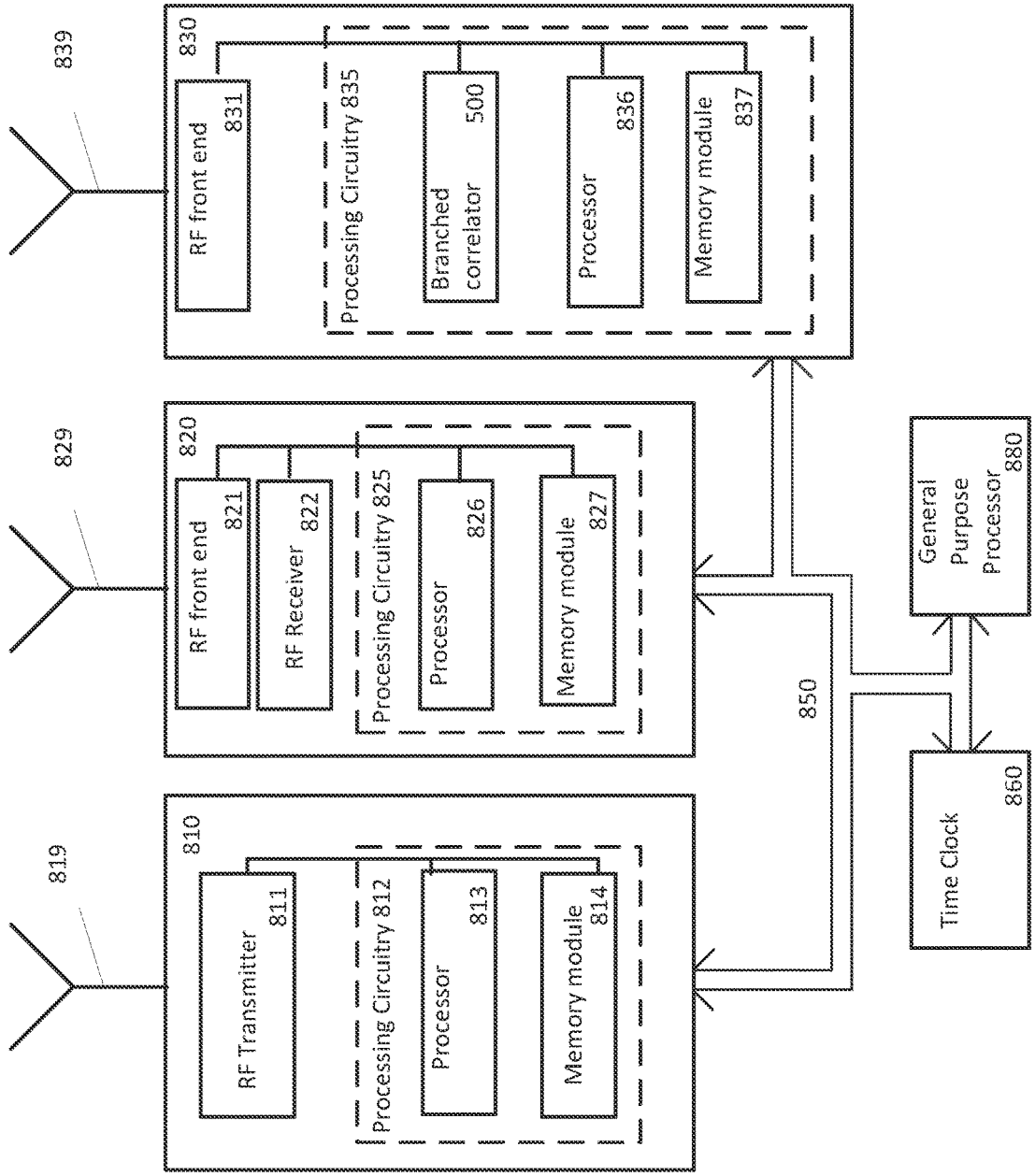
FIG. 8 illustrates a block diagram of an example wireless communication device which, according to an embodiment of the disclosure, may be used as all or as part of the measuring station.

FIG. 8 illustrates a block diagram of an example wireless communication device 800 which, according to an embodiment of the disclosure, may be used as all or as part of the (airborne) measuring station 110.

The wireless communication device 800 may be any device capable of wirelessly receiving signals and transmitting signals and may be configured to execute any of the methods of the IEEE 802.11-2016 Standard. Wireless communication device 800 may be one or more wireless devices that are based upon the IEEE 802.11 specification and each may be configured to act as a transmitter or a receiver. The embodiment described herein is that where wireless communication device 800 includes a wireless transmitter 810, a first wireless receiver 820 and a second wireless receiver 830. In some embodiments, the first wireless receiver 820 is a conventional Wi-Fi receiver that complies with the IEEE 802.11 Standard, whereas the second wireless receiver 830 is configured to perform the correlation method and/or the geo-location as discussed in this disclosure. The wireless communication device 800 may also include a time clock 860 and a general purpose processor 880 which are interconnected to the three wireless devices 810, 820 and 830 by a data bus 850.

In some embodiments, the wireless transmitter 810 includes an RF transmitter 811 and processing circuitry 812 that includes processor 813, and memory module 814. The wireless transmitter 810 may also include one or more wireless antennas such as wireless antennas 819. The RF transmitter 811 may perform the functions of scrambling, encoding, interleaving, mapping pilot insertion, IFFT (inverse fast Fourier transform), guard interval insertion and I-Q modulation as described in IEEE 802.11-2106, and amplification for the transmission of the OFDM packets via an antenna 819. In some embodiments the processing circuitry 812 and/or the processor 813 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some functions of the RF transmitter 811 may be performed by the processing circuitry 812. The processing circuitry 812 may be configured to control any of the methods and/or processes described herein and/or to cause such methods, and/or processes to be performed, e.g., by the RF transmitter 811. The memory module 814 may be configured to store data, programmatic software code and/or other information described herein. In some embodiments, the software may include instructions that, when executed by the processing circuitry 812, causes the processing circuitry 812 to perform the processes described herein with respect to the wireless transmitter 810.

In some embodiments, the wireless receiver 820 includes an RF front end 821, an RF receiver 822, processing circuitry 825 that includes a processor 826 and a memory module 827, and one or more wireless antennas such as wireless antenna 829. The RF front end 821 may perform the usual functions of an RF receiver front end such as low noise amplification, filtering and frequency down conversion so as to condition the received signal suitable for inputting to the RF receiver 822. The RF receiver 822 may perform the Wi-Fi OFDM functions of I-Q demodulation, guard interval removal, FFT (fast Fourier transform), pilot removal, de-interleaving, de-mapping, decoding and descrambling so as to condition the received signal suitable for inputting to the processing circuitry 825. In some embodiments the RF receiver 822 and/or the processing circuitry 825 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some or all of the functions of the RF receiver 822 may be performed by the processing circuitry 825. The processing circuitry 825 may be configured to control any of the methods and/or processes described herein and/or to cause such methods, and/or processes to be performed, e.g., by the wireless receiver 820. The memory module 827 is configured to store data, programmatic software code and/or other information described herein. In some embodiments, the software may include instructions that, when executed by the processing circuitry 825, causes the processing circuitry 825 to perform the processes described herein with respect to the wireless receiver 820.

In some embodiments, the wireless receiver 830 includes an RF front end 831, processing circuitry 835 that includes a branched correlator 500, a processor 836 and a memory module 837, and one or more wireless antennas such as wireless antenna 839. Of note, although FIG. 8 shows the branched correlator 500 as an element that is separate from the processor 836 and memory module 837, implementations are not limited to such. It is contemplated that the branched correlator 500, can be implemented in part or wholly using the processor 836 and the memory module 837. The RF front end 831 may perform the usual functions of an RF receiver front end such as low noise amplification, filtering and frequency down conversion so as to condition the received signal suitable for inputting to the processing circuitry 835. The conditioned received signal may first be inputted to the branched correlator 500. The branched correlator 500 may perform the preamble correlation as discussed above with reference to FIG. 5 and may also perform the function of correlation of the preamble and Signal field. In some embodiments the preamble and signal field are correlated while in other embodiments just the preamble is correlated and the Signal field is ignored. The branched correlator may also perform the functions of accumulation and rolling summation as described above with reference to FIG. 5 and as described below with reference to FIGS. 9, 10, 11 and 12. The processor 836 may be configured to control any of the methods and/or processes described herein and/or to cause such methods, and/or processes to be performed, e.g., by the wireless receiver 830. The memory module 837 is configured to store data, programmatic software code and/or other information described herein. In some embodiments, the software may include instructions that, when executed by the processing circuitry 835, causes the processing circuitry 835 to perform the processes described herein with respect to the wireless receiver 830. In some embodiments the processing circuitry 835, may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions.

According to this embodiment of the disclosure, the wireless receiver 820 may be configured to measure and monitor an input signal's attribute, such as may include one or more of a ranging signal transmitted by wireless transmitter 810, data and control packets, and the response signal, including control packets, transmitted by an access point or station that may be based upon the IEEE 802.11-2016 Standard. Such packets may include data null, ACK, RTS and CTS packets. The memory module 827 may store instructions for executing any method mentioned in the IEEE 802.11-2016 Standard, input signals, and results of processing by the processor 826, signals to be outputted and the like.

According to an embodiment of the disclosure, the RF transmitter 811 may be configured to transmit signals and the processing circuitry 812 may be configured to prepare the transmitted signal attributes based upon the IEEE 802.11-2016 Standard. Such transmitted packets may include data packets, control packets and management packets that are to be transmitted by a wireless station that is based upon the IEEE 802.11. Such control packets may include RTS and data null packets. The memory module 814 may store instructions for executing any method mentioned in the specification, input signals, and results of processing by the processor 813, signals to be outputted and the like.

According to another embodiment of the disclosure, the wireless receiver 820 may be configured to receive the transmissions of the wireless transmitter 810 and the processing circuitry 825 may be configured to monitor the attribute of the transmissions and determine the value of the time of departure of the transmissions from the wireless transmitter 810. These times may be accomplished by outputting a trigger that is timed to coincide with the reception packet from the wireless transmitter 810. This trigger may then be used to read the time from the time clock 860. Time clock 860 may have a precision that is higher than the internal TSF timer that is part of the wireless receiver 820.

According to an embodiment of the disclosure, the wireless transmitter 810 may be configured to transmit packets to another wireless communication device and the processing circuitry 812 may be configured to prepare the attributes of the packet to be transmitted.

According to another embodiment of the disclosure, the wireless receiver 830 may be configured to receive the transmissions of another target station, e.g., wireless communication and the processing circuitry 835 may be configured to monitor an attribute of the transmissions of the other wireless communication device, and determine the value of the time of arrival of packets from the other wireless communication device. These times may be accomplished by outputting a trigger that is timed to coincide with the reception packet from the other target station 120 or the wireless transmitter 810. This trigger may then be used to read the time from the time clock 860.

According to an embodiment of the disclosure, a general purpose processor 880 may be used to control the operations of the wireless communication device 800, e.g., measuring station, and in particular wireless transmitter 810, the wireless receiver 820, and wireless receiver 830. The general purpose processor 880 may also carry out the various calculations as described in this disclosure and may also prepare the measurement results for disclosure to an operator or user. In some embodiments, the general purpose processor 880 can be a computing device such as a tablet computer, desktop computer, laptop computer, or distributed computing, e.g., cloud computing. In some embodiments, the general purpose processor 880 can be a processor/CPU in the tablet, laptop computer, desktop computer, or distributed computing environment, etc. In some embodiments the general purpose processor 880 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the wireless communication device 800, e.g., measuring station, can be included in a single physical device/housing or can be distributed among several different physical devices/housings. Processor 880 may be used to perform the various calculations as described in this disclosure and may also prepare the measurement results for disclosure to an operator or user.

The process of "additive correlation", across bursts, as referred to above with reference to FIG. 5 and the accumulator buffers 530 to 537, is now described.

For each exchange of the ranging and response packets, 340 and 345 respectively, as described above with reference to FIG. 3, an RTT may be measured by detecting the preamble samples of the received signal of the response packet 345 by correlation with the known time domain samples of the preamble, as described above with reference to FIG. 5. Alternatively, an RTT may be measured by detecting the symbols of the preamble and Signal field of the received signal of the response packet 345 by correlation with the known time domain symbols of the preamble and the Signal field. For example, a correlation threshold may be selected and if the received symbol stream correlates above this threshold then the time of reception of the response packet 345 may be measured and compared to the time that the ranging packet 340 was transmitted in order to produce an RTT. In order to increase sensitivity, the correlation threshold might be set to a low value but, as described above with reference to FIG. 7, this increases the possibility of false correlations due to noise and other interfering Wi-Fi signals. As described above with reference to FIG. 4 a series of bursts of transmissions may be used. "Additive correlation" exploits the likelihood that the wanted response packets 345 will occur at the same time in each reception window 360 for each of the N transmissions during a burst. The process is to combine the results from all the windows in a burst so as to accumulate the "wanted" correlation peaks that occur around the same time in each window while rejecting the other unwanted correlation peaks which will be occurring at random times in each window.

Assuming that the sampling rate is S samples per second, a correlation value may be produced for every sample. During the reception window 360, correlation values, $C_n$, may be derived for every sample.

In reception window, $n, C_n = \{c_{n,1}, c_{n,2}, \ldots c_{n,W}\}$ where W is the number of samples in the reception window Additive correlation, AC, is the sum of all the reception windows in a burst, $$AC = \{ac_1, ac_2, \ldots ac_W\} \quad (11)$$

where, For i=1 to W, $ac_i = \Sigma_{n=1}^{N} C_n$ where, W is the number of samples or correlations in a reception window, and N is the number of packets in a burst.

Figure 9:
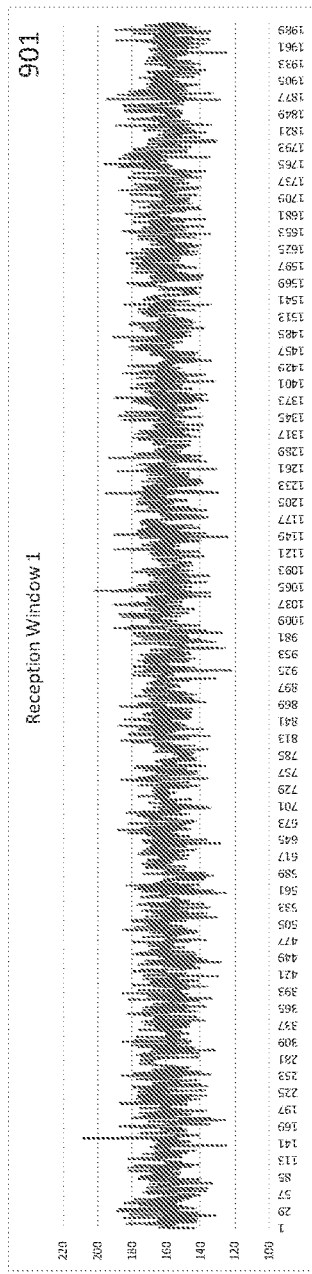
FIGS. 9, 10, 11, 12 and 13 are a set of plots that illustrate the combining of detection windows.
Figure 10:
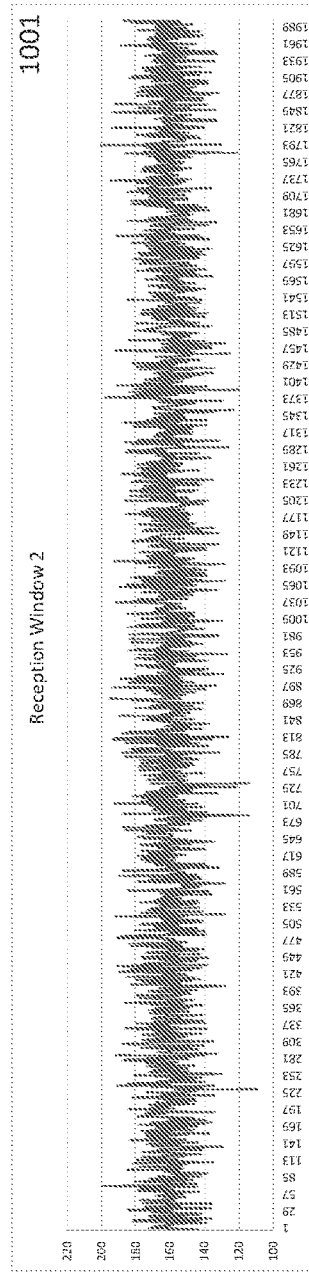
Figure 11:
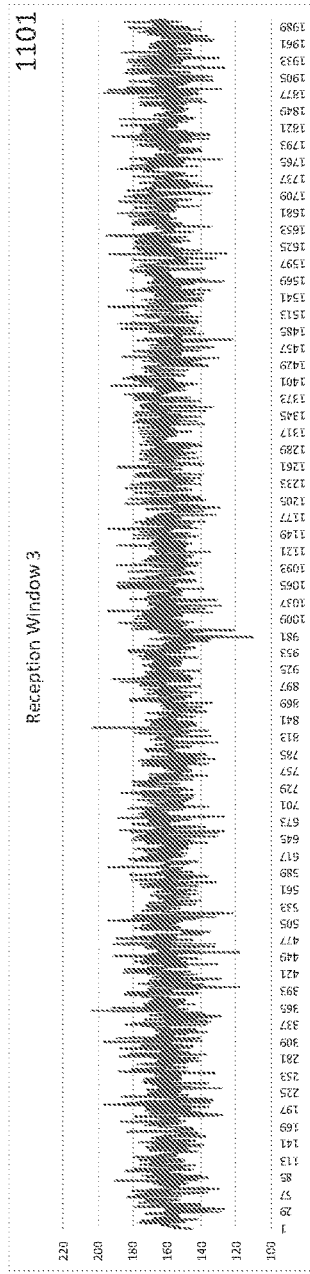
Figure 12:
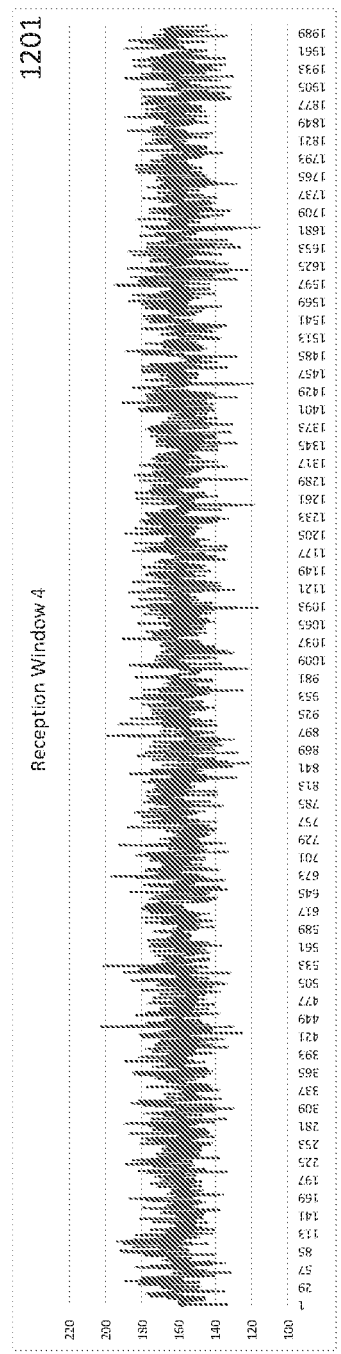
Figure 13:
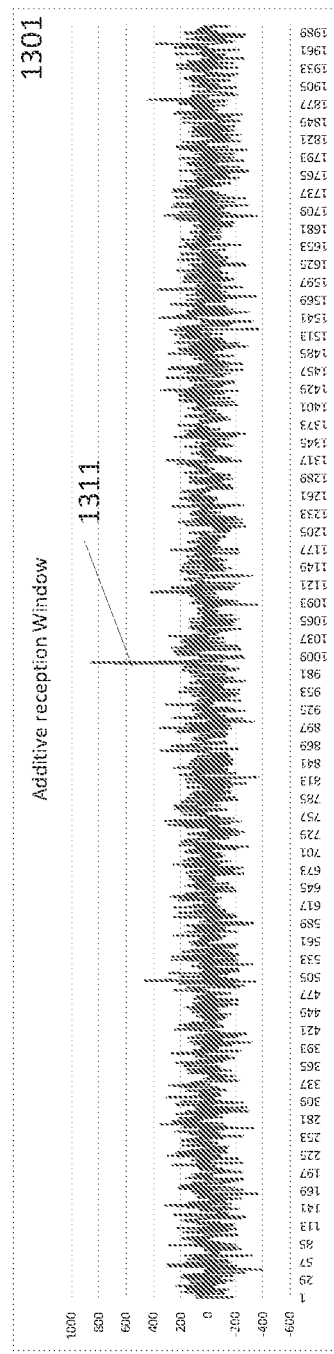

FIGS. 9, 10, 11, 12 and 13 are a set of plots that illustrate the combining of detection windows. FIG. 9 plot 901, FIG. 10 plot 1001, FIG. 11 plot 1101, and FIG. 12 plot 1201 are graphical representations of the output of one branch of the correlator 500 across the first four reception windows 360, respectively, of a burst 451. FIG. 13 plot 1301 is a graphical representation of the addition of the outputs of 100 such reception windows. The wanted correlation peak 1311 in this example is above the unwanted peaks in the additive reception window plot 1301 but in each of the individual reception windows plots, 901, 1001, 1101, 1201, the wanted correlation peak is not the maximum peak. FIGS. 9 to 13 show that by summing the results of all the correlations in the reception windows of a burst, the wanted correlation peak 1311, which is at a constant time compared to the noise peaks which are at random times, may be found even where the wanted peak is smaller than the noise peaks in each individual reception window.

Figure 14:
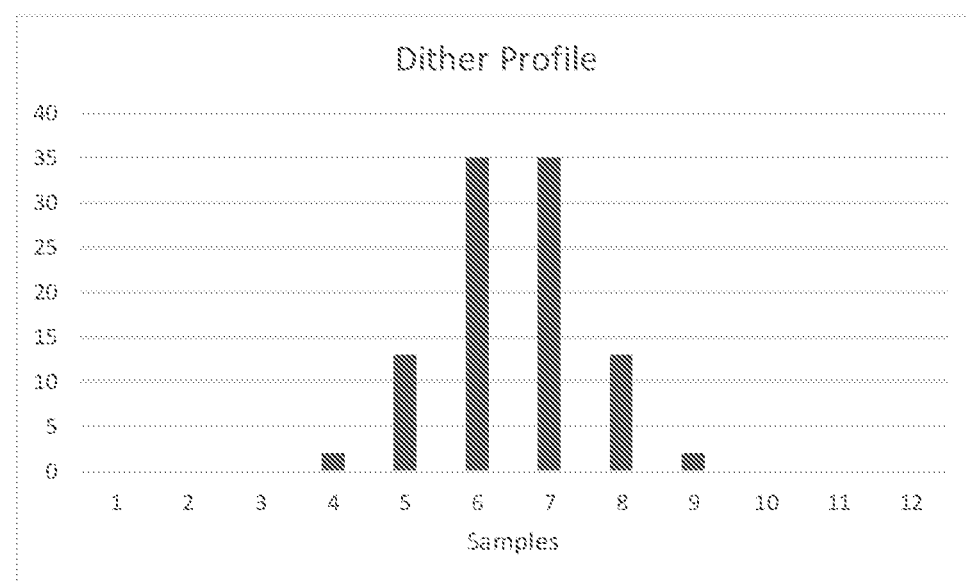
FIG. 14 is a histogram of a typical dither profile of a Wi-Fi target station.

In the general sense, Wi-Fi target stations, 120, will exhibit a dither in their turnaround time, ($t_{SIFS}$) 332, resulting in a jitter, Tv, between the relative timing of the correlation peaks. FIG. 14 is an example histogram of a typical dither profile of a Wi-Fi target station 120.

Figure 15:
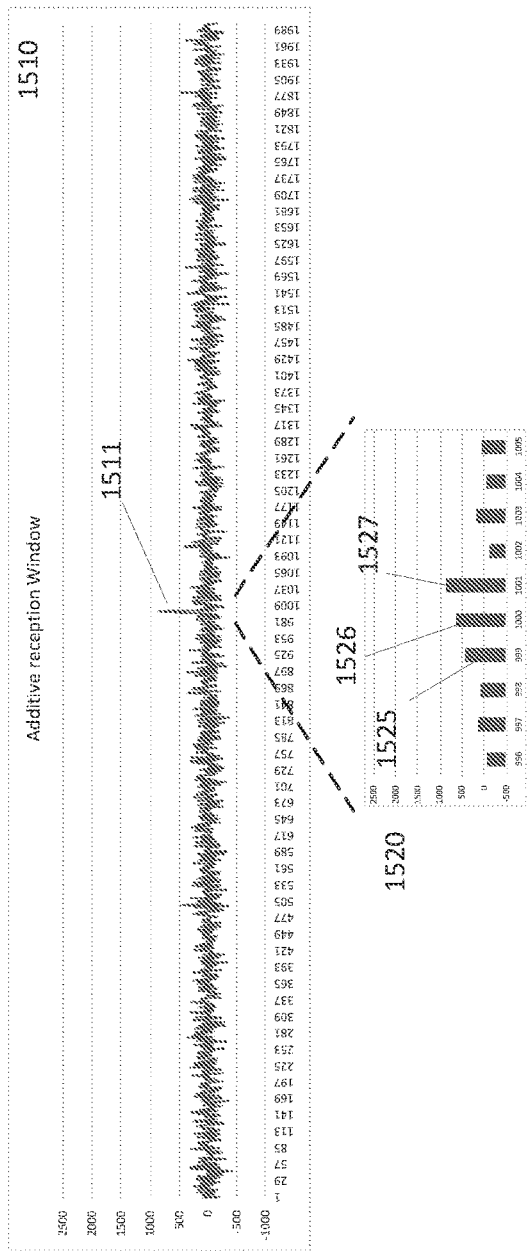
FIG. 15 is a reproduction of a plot in FIG. 10 with a different y-axis, together with an expanded view of the plot around the wanted peak.

FIG. 15 shows plot 1510, which is a reproduction of plot 1301 with a different y-axis, together with Plot 1520, which is an expanded view of the plot 1510 around the wanted peak 1511. Due to the dither of the target station 120, as discussed above with reference to FIG. 14, the simple summation process results in a number of peaks 1525, 1526, and 1527.

In one embodiment of this disclosure a rolling sum, RS, may be applied to the additive correlation, $ac_i$.

$$\text{For } i = \frac{(s-1)}{2} \text{ to } W - \frac{(s-1)}{2} \quad RS_i = \sum_{i-\frac{(s-1)}{2}}^{i+\frac{(s-1)}{2}} ac_i \quad (12)$$

Where s is the rolling sum window, i.e., the number of samples that are summed

Figure 16:
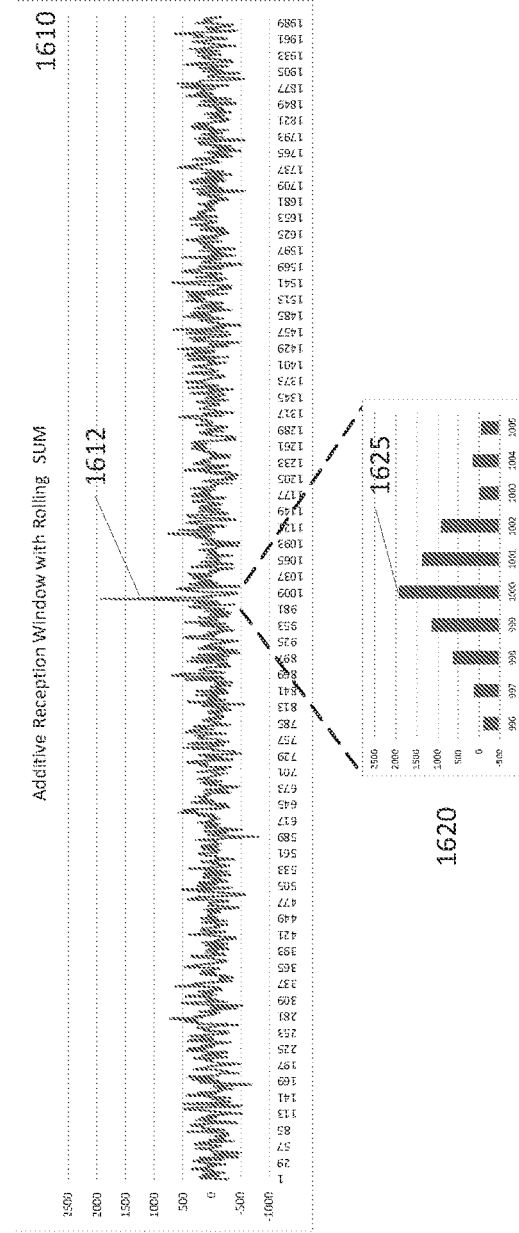
FIG. 16 is a graphical representation of the summation of the same correlations that resulted in plots in FIG. 15 but where a rolling sum is applied to the additive correlation.

FIG. 16 is a graphical representation containing plots 1610 and 1620 of the summation of the same correlations that resulted in plots 1510 and 1520, but where a rolling sum is applied to the additive correlation as described above with reference to equation (12). Summing the 100 correlations, after applying the rolling sum, results in the wanted peak 1612. It is noted that the peak 1612 is significantly higher that the peak 1511. Plot 1620 is an expanded view of the plot around the peak 1612. In this example, a rolling sum window with s=3 is used. Hence, the maximum peak, 1625 is the sum of peaks 1525, 1526, and 1527. Thus peak 1625 is the maximum of peak 1612 and is about twice as large as the peak 1511. As referred to above with reference to FIG. 5, the rolling sum window is used in blocks 540 to 547.

Figure 17:
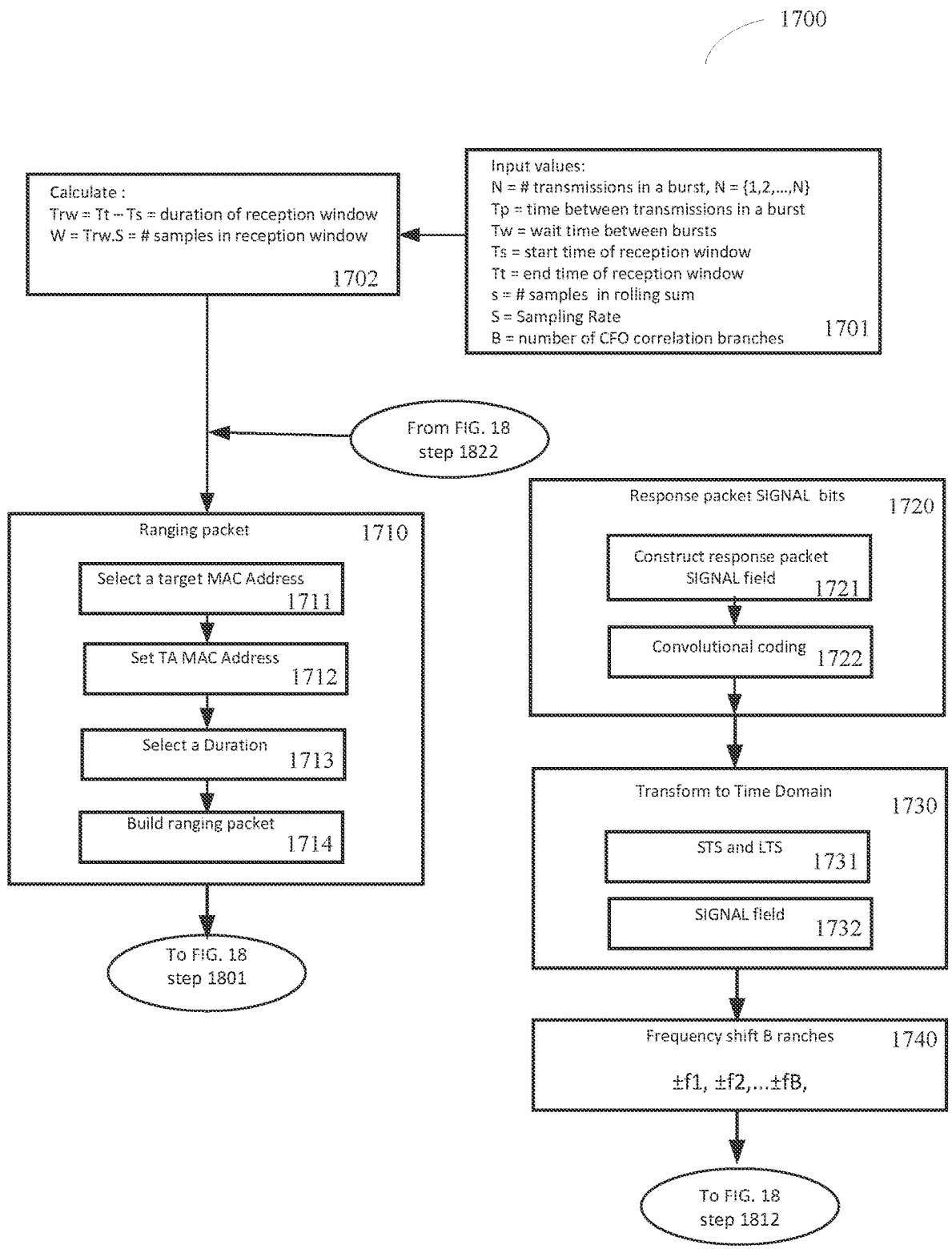
FIGS. 17 and 18 are a flow diagram of an example of one embodiment of the of the geo-location process as described in FIG. 3, utilizing the example wireless communication device which according to an embodiment of the disclosure may be used as or as part of the airborne measuring station.
Figure 18:
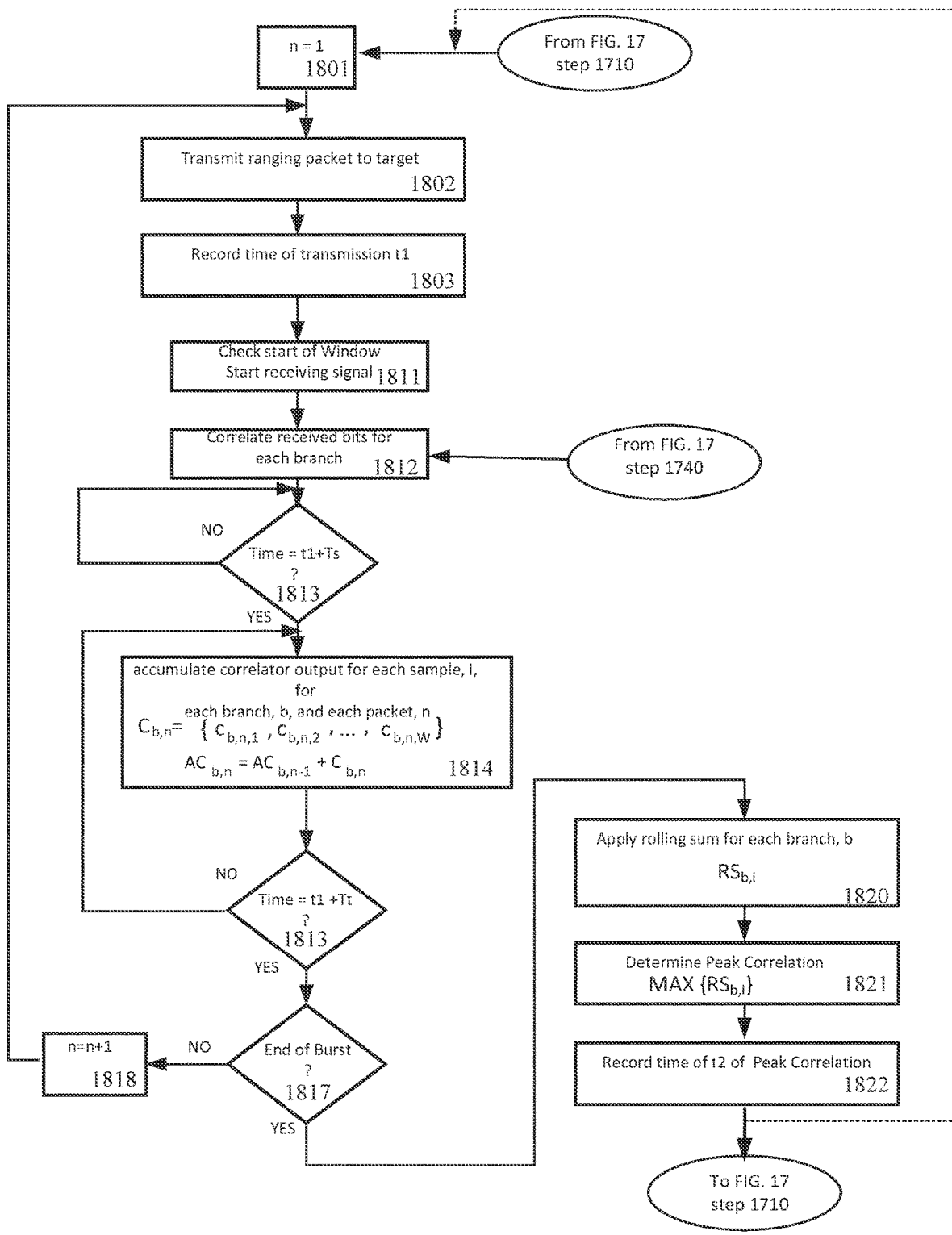

FIGS. 17 and 18 are a flow diagram 1700 of an example of one embodiment of the geo-location process as described in FIG. 3, utilizing the example wireless communication device which according to an embodiment of the disclosure may be used as or as part of the airborne measuring station 110. The process may start with step 1701 where a number of values are inputted. These values may be inputted to the processing circuitries 812, 825, and 835 in the wireless communication device 800 which according to an embodiment of the disclosure, may be used as all or as part of the airborne measuring station 110. In some embodiments, the values inputted may include:

N, the number of transmissions in a burst;
Tp, 350, the time between transmissions in a burst;
Tw, 471, the wait time between bursts;
Ts, 310, the start time of the reception window;
Tt, 320, the end time of the reception window;
s, the number of samples in the rolling sum;
S, the sampling rate; and
B, the number of branches in the branched correlator 500

At step 1702, certain values may be calculated. In some embodiments, the calculated values may include:

Trw, 360, the duration of the reception window, Trw=Tt−Ts;
W, the number of samples in the reception window, W=Trw·S; and These calculations may be performed by the processing circuitry 835 in the wireless receiver 830.

At step 1710, the ranging packet 340 is built. Step 1710 may be performed by the processing circuitry 812 in the wireless transmitter 810. Step 1710 may include steps 1711, 1712, 1713, and 1714. At step 1711, the MAC address of the target station 120 is selected and, at step 1712, the MAC address to be used in the ranging packet 340 is set. In the ranging packet 340, which may be an RTS or a data null, this MAC address will be the TA. In the corresponding response packet 345, this MAC address will be the RA. At step 1713, a duration value is selected for the MAC header of the ranging packet 340. This effectively sets the value of the duration field expected in the response packet 345. The value of the duration field in the response packet 345 will be equal to the value of the duration field in the ranging packet 340 minus SIFS minus the length of the response packet 345. Hence, by setting a known specific value in the duration field a unique value for the duration field in the response packet 345 may be set. Step 1713 may be followed by step 1714 where the MAC header and payload for the ranging packet 340 is constructed.

Step 1710 may be followed by step 1801 in FIG. 18, where the value for a variable n is initialized. The ranging packet 340 may be transmitted at step 1802. Step 1802 may include taking the MAC Header and payload constructed in step 1714, adding the preamble and header, and then scrambling, spreading and modulating the bits as performed by the RF transmitter 811 described in FIG. 8. The time t1 of transmission of the ranging packet 340 is recorded at step 1803. Step 1803 may be performed by wireless receiver 820 together with the time clock 860.

At step 1720, the expected raw bits for the response packet 345 signal field are determined. The determination of the signal field bits may be performed by the processing circuitry 835 and may be based upon inputs from the general purpose processor 880 and/or the processing circuitry 812. Step 1720 may start with step 1721 where the 24 raw bits of the signal field (rate, length and parity) are set and then, at step 1722, the Signal field is coded using the convolutional code as specified in the IEEE 802.11 Standard increasing the number of bits to 48. The convolutional coding may be performed by the processor 836. The output from step 1720 is the 48-bit stream representing the encoded signal field of the expected response packet 324. At step 1730, the preamble and Signal fields are transformed to the time domain in steps 1731 and respectively. The short and long training sequences of the preamble are specified in the Standard, clause 17.3.3, together with the time domain representation, Annex 1.1.3. Similarly, the signal field encoding is described in Clause 17.3.4 and the generation of the signal field, together with the time domain representation, is described in Annex 1.1.4. In one embodiment of the disclosure, only the 360 time domain symbols may be used, and steps 1720 and 1732 may be omitted. Step 1730 may be followed by step 1740 where the time domain symbols may be shifted in frequency as described above with reference to FIG. 5 so as to produce B frequency shifted time domain symbol sets.

Step 1740 may be followed by step 1812 in FIG. 14 where the B frequency shifted time domain symbol sets are used to correlate against the received time domain signal from step 1811. The correlation may be performed by the branched correlator 500. At step 1803, the time t1 of the transmission of the ranging packet is recorded. The ToD, t1, may be recorded by processing circuitry 835 from an input from wireless receiver 820.

Once the reception window has opened, i.e., a time of Ts 310 has elapsed, the output from the receiver front end 831 is available at step 1812 and is continuously correlated against the B frequency shifted time domain symbols from step 1720. The signal may be received by wireless receiver 830 and the correlation may be performed by the branched correlator 500.

The following steps, 1813 to 1822 may all be performed by the processing circuitry 835 in wireless receiver 830. At step 1813, it is checked if the reception window 360 has ended, i.e., a time of Tt 320 has elapsed since time t1 noted in step 1803. If not, then the received signal is continuously correlated against the B shifted time domain symbols from step 1720. Once, at step 1813, it is determined that the reception window has closed, then, at step 1814, the correlated output, $C_{b,n}$, for each sample of the reception window, for each branch, b, is accumulated, $AC_{b,n}$. $C_{b,n} = \{c_{b,n,1}, c_{b,n,2}, \ldots, c_{b,n,W}\}$ where W is the number of samples in the reception window n. The accumulated correlations across the burst, for the nth reception window, for branch b, $AC_b$, $$AC_{b,n} = AC_{b,(n-1)} + C_{b,n}$$

And $AC_{b,n} = \{ac_{b,1}, ac_{b,2}, \ldots, ac_{b,W}\}$, where, for i=1 to W, $ac_{b,i} = \Sigma_{n=1}^{n} C_{b,n}$ At step 1817, a check may be made to determine if the burst of N has completed. If not, then step 1817 may be followed by step 1818 where n is incremented and the process returns to step 1802 where another ranging packet 345 is transmitted. The end of a burst may be determined by several means. If, at step 1817, the value of n is noted to be N, then that would indicate the end of a burst. In the unlikely event that a ranging packet transmission was not noted in step 1803, then a gap in the time between the transmission times, in the order of the wait time Tw 471, may be used.

If, at step 1817, it is determined that a burst of N transmissions has ended, the accumulated correlation outputs for each branch, i.e., the additive reception window as described above with reference to FIGS. 9 to 13 and FIGS. 15 and 16, and depicted as plots 1301 and 1510, is passed to step 1820 where the rolling sum window is applied across the additive correlation of each branch.

The summed correlations across the burst, for branch b, $AC_b$, $$AC_b = \{ac_{b,1}, ac_{b,2}, \ldots, ac_{b,W}\},$$

where, for i=1 to W, $ac_{b,i} = \Sigma_{n=1}^{N} C_{b,n}$

Applying the rolling sum window is described above with reference to FIG. 16 and plot 1610. For $$i = \frac{(s-1)}{2} \text{ to } W - \frac{(s-1)}{2} \ RS_{b,i} = \sum_{i-\frac{(s-1)}{2}}^{i+\frac{(s-1)}{2}} ac_{b,i}$$

At step 1821, the peak correlation, $P_c$, of the B additive correlations after the rolling sum has been applied, is determined:

$$Pc = MAX\{RS_{b,i}\}$$

Then, at step 1822, the time, t2 of the reception of peak Pc is recorded, where t2 may be the time elapsed since the start of the reception window. The effective RTT for that burst may then be calculated and used in geo-location calculations.

The process may then return to step 1710 where another ranging packet may be created to start a new burst with a different ranging packet 340, or alternatively, may return to step 1801 if the same ranging packet is to be used for the next burst, or, the process may terminate.

Figure 19:
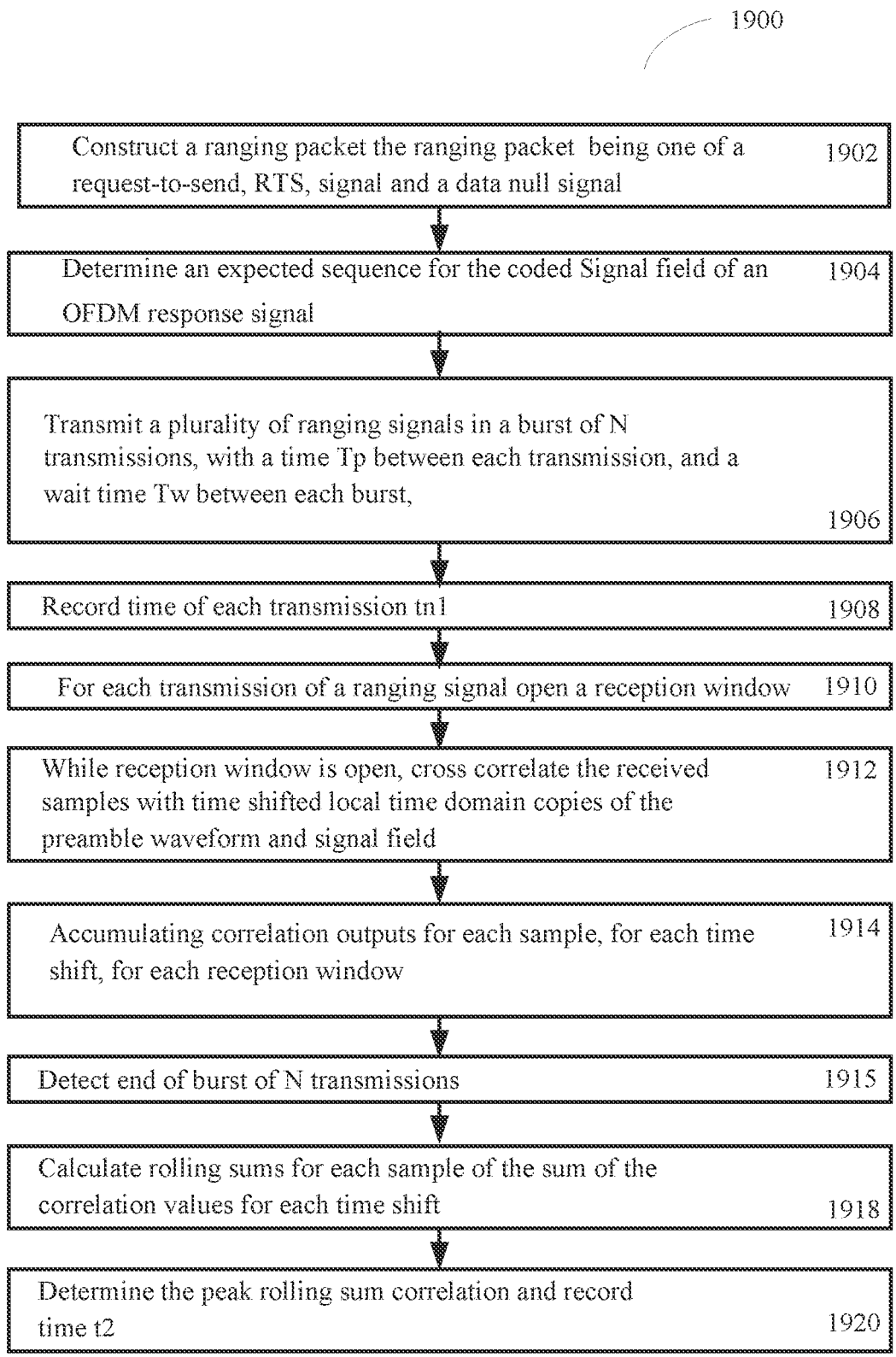
FIG. 19 is a flowchart of an example process for determining an RTT at a first wireless device, such as an airborne station, a geo-location of a second wireless device, such as a mobile ground station.

FIG. 19 is a flowchart of an example process 1900 for determining an RTT at a first wireless device, such as an airborne station, a geo-location of a second wireless device, such as a mobile ground station. The process includes constructing, via the processing circuitry 812 in RF transmitter 810, a ranging signal 340. The ranging signal 340 being one of a request-to-send, RTS, signal and a data null signal (step 1902). The process further includes determining the expected sequence for the coded Signal field of an OFDM response signal 345 (step 1904). The process includes transmitting, via the RF transmitter 811, a plurality of ranging signals in a burst of N transmissions, with a time Tp 350 between each transmission, and a wait time Tw 471 between each burst 451 (step 1906), and recording a time t1 of each transmitted ranging signal (step 1908).

The process further includes opening a reception window (step 1910) and while the reception window is open, cross correlating the receiving samples with frequency shifted local time domain copies of the OFDM preamble and Signal field (step 1912). The signal samples are received via the RF front end 831 of wireless receiver 830. The time domain copies of the preamble and Signal field are constructed by the processing circuitry 835 and the correlations are performed by the branched correlator 500. The process further includes accumulating the correlation values for each sample for each frequency shift for each reception window, via the memory module 837 and the processor 836, (step 1914).

At step, 1915, the end of the burst of N transmissions is detected. The process includes, via the processor 836 and memory module 837, taking the additive N correlations for each sample in each of the N reception windows for each frequency shift, determined at step 1914 and then, via processor 836 and/or general purpose processor 880, calculating rolling sums for each sample in each frequency shift of the sum of the N correlations (step 1918). The process further includes determining, via processor 836 and/or general purpose processor 880, the peak of the rolling sums across all samples and frequency shifts and recording the time t2 which is then used, together with the recorded times tn1, to calculate the RTT for that burst of N transmissions (step 1920). The value RTT is then provided to the geo-location calculations.

As discussed above with reference to FIGS. 17 and 18, an alternative is to omit step of process 1900, and, at step 1912, only correlate against the preamble and not include the Signal field.

Correlating against only part of the response packet, i.e., just the preamble or just the preamble and Signal field, may result in the probability of many spurious correlations due to other OFDM signals as well as correlations due to noise. Counter to this, however, is that if the rest of the response packet is included, then it would be necessary to have 127 copies of the complete packet, in the time domain, so as to cover each of the possible scrambler codes. In addition, more branches would be required in the branched correlator 500 so as to reduce the frequency shifts in order to cover the smaller CFO required for the increase duration of the packet. As will be appreciated by one of moderate skill in the art, the processing requirement would therefore be greatly increased together with the accompanying increase in power consumption and costs. The additive correlation scheme described herein provides a significant advantage to correlations that occur at the same time within each of the reception windows and hence, although the chance of more spurious correlations is increased due to the smaller number of samples in the correlation, because the spurious correlations are randomly spaced in a reception window, the additive correlation scheme effectively selects the wanted correlation.

Figure 20:
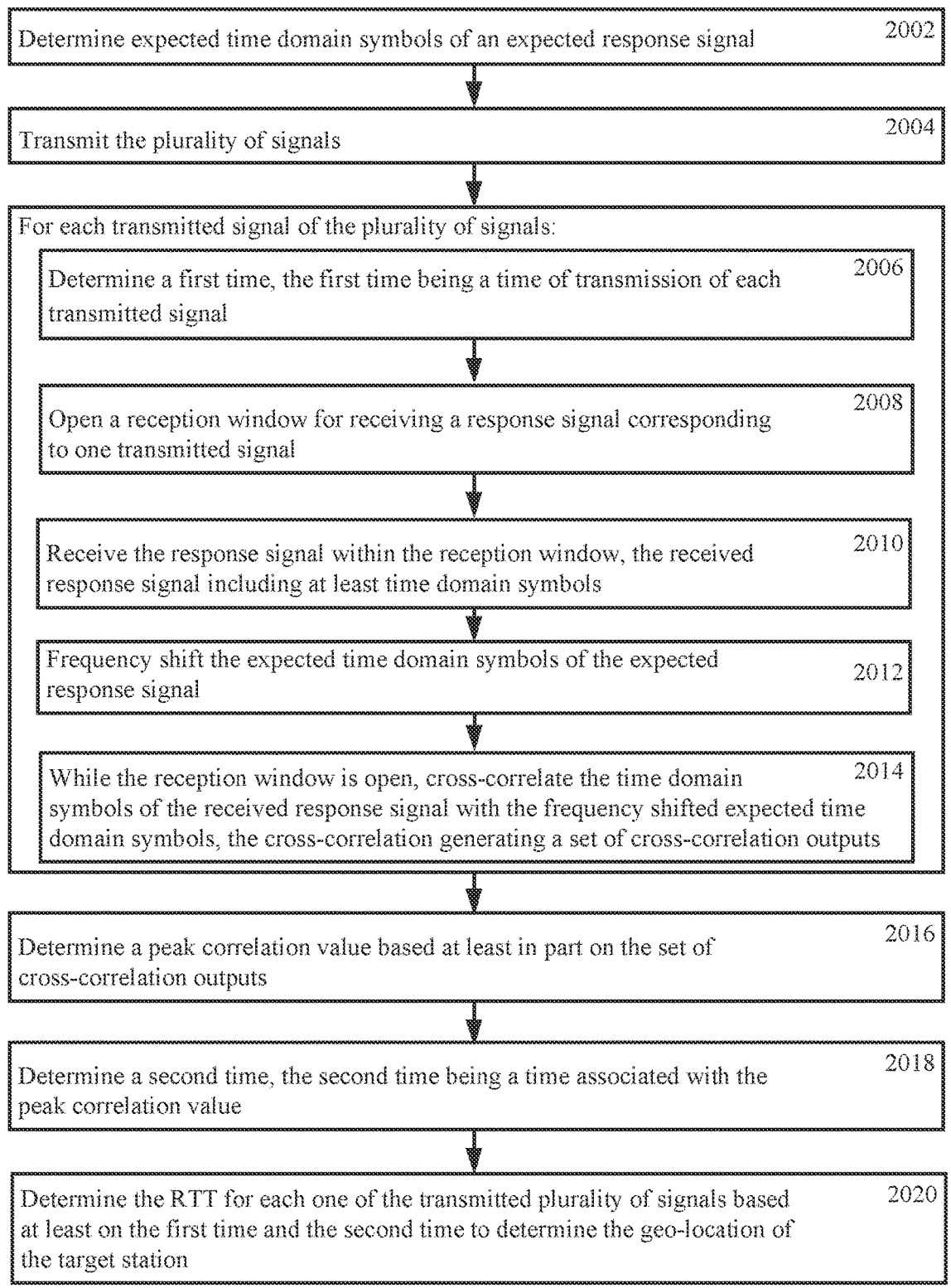
FIG. 20 is a is a flowchart of another example process in a wireless device for a geo-location of a target station RTTs of a plurality of signals transmitted by the wireless device to the target station and a plurality of response signals received from the target station.

FIG. 20 is a is a flowchart of another example process in a wireless device for a geo-location of a target station using round-trip times (RTTs) of a plurality of signals transmitted by the wireless device to the target station and a plurality of response signals received from the target station. At step 2002, expected time domain symbols of an expected response signal are determined, and, at step 2004, the plurality of signals is transmitted.

Steps 2006-2014 are performed for each transmitted signal of the plurality of signals. At step 2006, a first time is determined, where the first time is a time of transmission of each transmitted signal. At step 2008, a reception window is opened for receiving a response signal corresponding to one transmitted signal, and, at step 2010, the response signal is received within the reception window, where the received response signal includes at least time domain symbols. At step 2012, the expected time domain symbols of the expected response signal are frequency shifted. At step 2014, while the reception window is open, the time domain symbols of the received response signal are cross-correlated with the frequency shifted expected time domain symbols. The cross-correlation generates a set of cross-correlation outputs.

In addition, the method includes, at step 2016, determining a peak correlation value based at least in part on the set of cross-correlation outputs, at step 2018, determining a second time that is a time associated with the peak correlation value, and, at step 2020, determining the RTT for each one of the transmitted plurality of signals based at least on the first time and the second time to determine the geo-location of the target station.

The following is a list of nonlimiting embodiment examples.

Embodiment 1. A method in a first wireless device (WD), the method comprising:
transmitting a plurality of orthogonal frequency diversity modulation, OFDM, ranging signals and storing a time t1 of each transmission;
determining an expected sequence of time domain symbols;
opening a reception window after each transmission, and while the reception window is open:
cross-correlating the received time domain symbols with frequency shifted local time domain copies of the expected time domain symbols;
summing the correlation outputs for each sample, for each frequency shift, for each reception window;
determining the peak correlation value;
storing a time t2 that corresponds to the peak correlation value; and
calculating a round trip time, RTT, for that plurality of ranging signals.

Embodiment 2. The method of Embodiment 1, wherein rolling sums are calculated for each sample in the summed correlation for each frequency shift and determining the peak rolling sum correlation value.

Embodiment 3. The method of Embodiment 1, wherein the plurality of orthogonal frequency diversity modulation, OFDM, ranging signals are transmitted in a burst of N transmissions with a time Tp between each transmission, and a wait time Tw between each burst, and, after summing the correlation outputs for each sample, for each frequency shift, for each reception window in the burst of N transmissions:
detecting the end of a burst of N transmissions; and.
calculating a round trip time, RTT, for that burst.

Embodiment 4. The method of Embodiment 1, wherein each transmitted ranging signal is one of a request-to-send, RTS, signal and a data null signal.

Embodiment 5. The method of Embodiment 1, wherein the expected sequence of time domain symbols is the OFDM preamble.

Embodiment 6. The method of Embodiment 1, wherein the expected sequence of time domain symbols is the OFDM preamble and Signal field.

Embodiment 7. The method of Embodiment 1, further comprising:

using a branched correlator using multiple cross correlators in parallel branches, each cross correlator tuned to a different time offset to cover the range of carrier frequency offsets, CFO, permitted by an IEEE 802.11 Standard;

Embodiment 8. The method of Embodiment 2, wherein the rolling sum value RS is defined as:

For $$i = \frac{(s-1)}{2} \text{ to } W - \frac{(s-1)}{2} \quad RS_i = \sum_{i-\frac{(s-1)}{2}}^{i+\frac{(s-1)}{2}} ac_i$$

where s=samples in the rolling sum window,
W=number of samples in the reception window,
and, for i=1 to W, $ac_i = \Sigma_{n=1}^{N} ac_{ni}$ where N is the number of packets in a burst.

Embodiment 9. A first wireless device (WD), comprising:
a transmitter configured to transmit a plurality of orthogonal frequency diversity modulation, OFDM, ranging signals;
processing circuitry in communication with the transmitter, the processing circuitry configured to:
determine an expected sequence of time domain symbols;
open a reception window after each transmission, and while the reception window is open:
cross-correlate the received time domain symbols with frequency shifted local time domain copies of the expected time domain symbols;
sum the correlation outputs for each sample, for each frequency shift, for each reception window;
determine the peak correlation value;
store a time t2 that corresponds to the peak correlation value; and
calculate a round trip time, RTT, for that plurality of ranging signals.

Embodiment 10. The method of Embodiment 9, wherein rolling sums are calculated for each sample in the summed correlation for each frequency shift and determining the peak rolling sum correlation value.

Embodiment 11. The first WD of Embodiment 9, wherein the transmitter is configured to transmit the plurality of orthogonal frequency diversity modulation, OFDM, ranging signals in a burst of N transmissions with a time Tp between each transmission, and a wait time Tw between each burst, and, the processor is further configured to:
sum the correlation outputs for each sample, for each frequency shift, for each reception window in the burst of N transmissions;
detect the end of a burst of N transmissions; and
calculate a round trip time, RTT, for that burst.

Embodiment 12. The first WD of Embodiment 9, wherein each transmitted ranging signal is one of a request-to-send, RTS, signal and a data null signal.

Embodiment 13. The first WD of Embodiment 9, wherein the processing circuitry is further configured to use a branched correlator using multiple cross correlators in parallel branches, each cross correlator tuned to a different time offset to cover the range of carrier frequency offsets, CFO, permitted by an IEEE 802.11 Standard.

Embodiment 14. The first WD of Embodiment 10, wherein the rolling sum value RS is defined as:

For $$i = \frac{(s-1)}{2} \text{ to } W - \frac{(s-1)}{2} \quad RS_i = \sum_{i-\frac{(s-1)}{2}}^{i+\frac{(s-1)}{2}} ac_i$$

where s=samples in the rolling sum window,
W=number of samples in the reception window,
and, for i=1 to W, $ac_i = \Sigma_{n=1}^{N} ac_{ni}$ where N is the number of packets in a burst.

Embodiment 15. An airborne station, comprising:
a transmitter configured to:
transmit a plurality of ranging signals in a burst of N transmissions, with a time Tp between each transmission, and a wait time Tw between each burst, a ranging signal being one of a request-to-send, RTS, signal and a data null signal;
store the time of each transmission, and
a receiver configured to:
open a reception window after each transmission, and while the reception window is open cross-correlate the received time domain symbols with frequency shifted local time domain copies of the expected time domain symbols;
processing circuitry in communication with the transmitter and receiver, the processing circuitry configured to:
sum the correlation outputs for each sample, for each frequency shift, for each reception window in the burst of N transmissions;
detect the end of a burst of N transmissions;
determine the peak correlation value;
store a time t2 that corresponds to the peak correlation value; and
calculate a round trip time, RTT, for that burst.

Embodiment 16. The airborne station of Embodiment 15, wherein rolling sums are calculated for each sample in the summed correlation for each frequency shift and determining the peak rolling sum correlation value.

Embodiment 17. The airborne station of Embodiment 15, wherein the processing circuitry is further configured to use a branched correlator using multiple cross correlators in parallel branches, each cross correlator tuned to a different time offset to cover the range of carrier frequency offsets, CFO, permitted by an IEEE 802.11 Standard.

Embodiment 18. The airborne station of Embodiment 16, wherein the rolling sum value RS is defined as:

For $$i = \frac{(s-1)}{2} \text{ to } W - \frac{(s-1)}{2} \quad RS_i = \sum_{i-\frac{(s-1)}{2}}^{i+\frac{(s-1)}{2}} ac_i$$

where s=samples in the rolling sum window,
W=number of samples in the reception window,
and, for i=1 to W, $ac_i = \Sigma_{n=1}^{N} ac_{ni}$ where N is the number of packets in a burst.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of transmissions in a burst, the time between transmissions within a burst, the wait time between bursts, the start and end times of the reception window, the time allowance for the maximum jitter of the turnaround time (SIFS) of a response signal, the duration field value(s), the MAC address used in the ranging packet, the number of branches and frequency shifts in the branched correlator, the details of the rolling sum, the use of accumulation. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method in a wireless device (WD) for determining a geo-location of a target station using round-trip times (RTTs) of a plurality of signals transmitted by the WD to the target station and a plurality of response signals received from the target station corresponding to the plurality of signals transmitted by the WD, the method comprising:
   determining expected time domain symbols of an expected response signal;
   transmitting the plurality of signals;
   for each transmitted signal of the plurality of signals:
      determining a first time, the first time being a time of transmission of each transmitted signal;
      opening a reception window for receiving a response signal corresponding to one transmitted signal;
      receiving the response signal within the reception window, the received response signal including at least time domain symbols;
      frequency shifting the expected time domain symbols of the expected response signal;
      while the reception window is open, cross-correlating the time domain symbols of the received response signal with the frequency shifted expected time domain symbols, the cross-correlation generating a set of cross-correlation outputs;
   determining a peak correlation value based at least in part on the set of cross-correlation outputs;
   determining a second time, the second time being a time associated with the peak correlation value; and
   determining the RTT for each one of the transmitted plurality of signals based at least on the first time and the second time to determine the geo-location of the target station.

2. The method of claim 1, the method further comprising:
   summing the set of cross-correlation outputs of the open reception window of each signal based at least on a predetermined criterion; and
   determining a set of rolling sums from the summed set of cross-correlation outputs to determine the peak correlation value.

3. The method of claim 2, wherein cross-correlating the time domain symbols of the received response signal is performed in a set of branches, each branch of the set of branches tuning to a different frequency offset to cover a range of carrier frequency offsets, wherein summing the set of cross-correlation outputs is performed per each branch of the set of branches, and wherein determining the set of rolling sums is performed for each branch of the set of branches.

4. The method of claim 2, wherein the predetermined criterion includes at least one of a plurality of samples, a plurality of frequency shifts, and the reception window of each transmitted signal, and summing the set of cross-correlation outputs is performed for any one of each sample of the plurality of samples, each frequency shift of the plurality of frequency shifts, and the reception window of each transmitted signal.

5. The method of claim 2, wherein determining the set of rolling sums is based at least on an amount of samples in a rolling sum window, a number of samples in the reception window, and a number of packets in a burst.

6. The method of claim 2, the method further including:
detecting an end of transmission of the plurality of signals; and
determining the set of rolling sums is performed after the end of transmission of the plurality of signals is detected.

7. The method of claim 1, wherein the transmitted plurality of signals are orthogonal frequency diversity modulation (OFDM) signals transmitted in a burst of N transmissions, the transmitted plurality of signals having a time between each transmission and a wait time between the burst and a subsequent burst.

8. The method of claim 1, wherein each transmitted signal is one of a request-to-send (RTS) signal and a data null signal.

9. The method of claim 1, wherein the expected time domain symbols of the expected response signal include at least one of a OFDM preamble and a signal field.

10. A wireless device (WD) configured to determine a geo-location of a target station using round-trip times (RTTs) of a plurality of signals transmitted by the WD to the target station and a plurality of response signals received from the target station corresponding to the plurality of signals transmitted by the WD, the WD comprising:
a transceiver configured to:
transmit the plurality of signals; and
receive a response signal within a reception window for each transmitted signal of the plurality of signals, the received response signal including at least time domain symbols; and
processing circuitry in communication with the transceiver, the processing circuitry being configured to:
determine expected time domain symbols of an expected response signal;
transmitting the plurality of signals;
for each transmitted signal of the plurality of signals:
determine a first time, the first time being a time of transmission of each transmitted signal;
open the reception window for receiving the response signal corresponding to one transmitted signal;
frequency shift the expected time domain symbols of the expected response signal;
while the reception window is open, cross-correlate the time domain symbols of the received response signal with the frequency shifted expected time domain symbols, the cross-correlation generating a set of cross-correlation outputs;
determine a peak correlation value based at least in part on the set of cross-correlation outputs;
determine a second time, the second time being a time associated with the peak correlation value; and
determine the RTT for each one of the transmitted plurality of signals based at least on the first time and the second time to determine the geo-location of the target station.

11. The WD of claim 10, the processing circuitry being further configured to:
sum the set of cross-correlation outputs of the open reception window of each signal based at least on a predetermined criterion; and
determine a set of rolling sums from the summed set of cross-correlation outputs to determine the peak correlation value.

12. The WD of claim 11, wherein cross-correlating the time domain symbols of the received response signal is performed in a set of branches, each branch of the set of branches tuning to a different frequency offset to cover a range of carrier frequency offsets, wherein summing the set of cross-correlation outputs is performed per each branch of the set of branches, and wherein determining the set of rolling sums is performed for each branch of the set of branches.

13. The WD of claim 11, wherein the predetermined criterion includes at least one of a plurality of samples, a plurality of frequency shifts, and the reception window of each transmitted signal, and summing the set of cross-correlation outputs is performed for any one of each sample of the plurality of samples, each frequency shift of the plurality of frequency shifts, and the reception window of each transmitted signal.

14. The WD of claim 11, wherein determining the set of rolling sums is based at least on an amount of samples in a rolling sum window, a number of samples in the reception window, and a number of packets in a burst.

15. The WD of claim 11, the processing circuitry being further configured to:
detect an end of transmission of the plurality of signals; and
determine the set of rolling sums is performed after the end of transmission of the plurality of signals is detected.

16. The WD of claim 10, wherein the transmitted plurality of signals are orthogonal frequency diversity modulation (OFDM) signals transmitted in a burst of N transmissions, the transmitted plurality of signals having a time between each transmission and a wait time between the burst and a subsequent burst.

17. The WD of claim 10, wherein each transmitted signal is one of a request-to-send (RTS) signal and a data null signal.

18. The WD of claim 10, wherein the expected time domain symbols of the expected response signal include at least one of a OFDM preamble and a signal field.

19. A measuring station configured to determine a geo-location of a target station using round-trip times (RTTs) of a plurality of signals transmitted by the measuring station to the target station and a plurality of response signals received from the target station corresponding to the plurality of signals transmitted by the measuring station, the measuring station comprising:
a transceiver configured to:
transmit the plurality of signals; and receive a response signal within a reception window for each transmitted signal of the plurality of signals, the received response signal including at least time domain symbols; and processing circuitry in communication with the transceiver, the processing circuitry being configured to:
determine expected time domain symbols of an expected response signal;
for each transmitted signal of the plurality of signals:
determine a first time, the first time being a time of transmission of each transmitted signal;
open the reception window for receiving the response signal corresponding to one transmitted signal;
frequency shift the expected time domain symbols of the expected response signal;
while the reception window is open, cross-correlate the time domain symbols of the received response signal with the frequency shifted expected time domain symbols, the cross-correlation generating a set of cross-correlation outputs;
sum the set of cross-correlation outputs of the open reception window of each signal based at least on a predetermined criterion;
determine a set of rolling sums from the summed set of cross-correlation outputs to determine a peak correlation value;
determine the peak correlation value based at least in part on the set of cross-correlation outputs;
determine a second time, the second time being a time associated with the peak correlation value; and
determine the RTT for each one of the transmitted plurality of signals based at least on the first time and the second time to determine the geo-location of the target station.

20. The measuring station of claim 19, wherein cross-correlating the time domain symbols of the received response signal is performed in a set of branches, each branch of the set of branches tuning to a different frequency offset to cover a range of carrier frequency offsets, wherein summing the set of cross-correlation outputs is performed per each branch of the set of branches, and wherein determining the set of rolling sums is performed for each branch of the set of branches; and the predetermined criterion includes at least one of a plurality of samples, a plurality of frequency shifts, and the reception window of each transmitted signal, and summing the set of cross-correlation outputs is performed for any one of each sample of the plurality of samples, each frequency shift of the plurality of frequency shifts, and the reception window of each transmitted signal.

* * * * *